United States Patent
Kato et al.

(10) Patent No.: US 9,950,687 B2
(45) Date of Patent: Apr. 24, 2018

(54) OCCUPANT PROTECTION DEVICE

(71) Applicant: TOYODA GOSEI CO., LTD., Kiyosu-shi, Aichi-ken (JP)

(72) Inventors: Hiroshi Kato, Kiyosu (JP); Shigeyuki Suzuki, Kiyosu (JP); Yasushi Masuda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/156,377

(22) Filed: May 17, 2016

(65) Prior Publication Data
US 2016/0347272 A1    Dec. 1, 2016

(30) Foreign Application Priority Data

May 28, 2015 (JP) .................................. 2015-109104
May 28, 2015 (JP) .................................. 2015-109105

(51) Int. Cl.
*B60R 21/233* (2006.01)
*B60R 21/207* (2006.01)
*B60R 21/00* (2006.01)

(52) U.S. Cl.
CPC .......... *B60R 21/233* (2013.01); *B60R 21/207* (2013.01); *B60R 2021/0048* (2013.01); *B60R 2021/23308* (2013.01)

(58) Field of Classification Search
CPC ................ B60R 21/233; B60R 21/207; B60R 2021/23308; B60R 2021/0048
See application file for complete search history.

(56) References Cited

U.S. PATENT DOCUMENTS

| | | | | |
|---|---|---|---|---|
| 3,753,576 A | * | 8/1973 | Gorman | ................ B60R 21/207 280/730.1 |
| 3,795,412 A | * | 3/1974 | John | ...................... B60R 21/08 180/274 |

(Continued)

FOREIGN PATENT DOCUMENTS

| | | |
|---|---|---|
| DE | 2410193 A1 | 9/1974 |
| DE | 198 59 988 A1 | 6/2000 |

(Continued)

OTHER PUBLICATIONS

European Search Report dated Oct. 6, 2016 in the corresponding EP application No. 16 170 068.7.

(Continued)

*Primary Examiner* — Darlene P Condra
(74) *Attorney, Agent, or Firm* — Posz Law Group, PLC

(57) ABSTRACT

An airbag of an occupant protection device as fully deployed includes a front panel section deployable in front of the head of an occupant for catching the head when the head moves forward, a left panel section deployable on a left side of the head for catching the head when the head moves towards the left, and a right panel section deployable on a right side of the head for catching the head when the head moves towards the right. The front panel section includes a main panel region that is deployable in such a manner as to be opposed to a front face of the head and an extended panel region that extends downwardly from the main panel region so as to catch at least an upper part of a thorax of the occupant.

12 Claims, 15 Drawing Sheets

(56) References Cited

U.S. PATENT DOCUMENTS

| | | | | |
|---|---|---|---|---|
| 3,836,168 A * | 9/1974 | Nonaka | ............ | B60R 21/18 |
| | | | | 280/733 |
| 3,953,049 A * | 4/1976 | Surace | ............ | B60R 21/08 |
| | | | | 280/730.1 |
| 8,579,321 B2 * | 11/2013 | Lee | ............ | B60R 21/214 |
| | | | | 280/729 |
| 8,807,593 B2 * | 8/2014 | Lee | ............ | B60R 21/213 |
| | | | | 280/730.1 |
| 9,156,426 B1 * | 10/2015 | Faruque | ............ | B60R 21/207 |
| 9,533,651 B1 * | 1/2017 | Ohno | ............ | B60R 21/23138 |
| 9,573,553 B2 * | 2/2017 | Ko | ............ | B60R 21/233 |
| 2013/0015642 A1 * | 1/2013 | Islam | ............ | B60R 21/207 |
| | | | | 280/730.1 |
| 2014/0327234 A1 * | 11/2014 | Heurlin | ............ | B60R 21/207 |
| | | | | 280/730.1 |
| 2016/0121839 A1 * | 5/2016 | Ko | ............ | B60R 21/233 |
| | | | | 280/730.1 |

FOREIGN PATENT DOCUMENTS

| | | |
|---|---|---|
| JP | 2000-344044 A | 12/2000 |
| JP | 2013-018378 A | 1/2013 |
| WO | 2007/099668 A1 | 9/2007 |

OTHER PUBLICATIONS

European Search Opinion for the corresponding EP application No. 16 170 068.7.

* cited by examiner

OCCUPANT PROTECTION DEVICE

CROSS REFERENCE TO RELATED APPLICATIONS

The Present application claims priority from Japanese Patent Application No. 2015-109104 of Kato et al., filed on May 28, 2015 and Japanese Patent Application No. 2015-109105 of Kato et al., filed on May 28, 2015, the entire disclosures of which are incorporated herein by reference.

BACKGROUND OF THE INVENTION

1. Field of the Invention

The present invention relates to an occupant protection device which protects a head of an occupant seated in a seat of a vehicle such as a driver's seat and a front passenger seat with an inflatable airbag in the event of a collision or the like.

2. Description of Related Art

DE198 59 988 A1, by way of example, discloses a known occupant protection device which includes an airbag inflatable with an inflation gas for catching a head of an occupant seated in a vehicle seat in the event of a collision. The airbag of this protection device is so configured, for covering the head of the occupant, to form a cup opening obliquely forward and downward, with more than one pipe-shaped inflatable portions arranged in a grid-like fashion.

However, since the airbag of the conventional protection device is deployable into a cup-shape opening obliquely forward and downwardly, the airbag can cover only an upper half region of the head on the front side of the occupant while it covers up to the back on the back side of the occupant. Therefore, it has a room for improvement in an appropriate protection of the whole head of the occupant which is likely to move forward away from the backrest of the seat.

SUMMARY OF THE INVENTION

An object of the present invention is to provide an occupant protection device having an airbag which is capable of catching the head of a vehicle occupant in an adequate fashion when the head moves forward in the event of a collision of the vehicle or the like.

The occupant protection device of the invention is adapted to be mounted on a vehicle such that the airbag, which is inflatable with an inflation gas, catches the head of an occupant seated in a seat of the vehicle when a collision or a potential collision is detected. The airbag includes a front panel section deployable in front of a front face of the head of the occupant for catching the head when the head moves forward, a left panel section deployable on a left side of the head for catching the head when the head moves towards the left, and a right panel section deployable on a right side of the head for catching the head when the head moves towards the right. The front panel section at full airbag deployment includes a main panel region that is deployable in such a manner as to be opposed to the front face of the head and an extended panel region that extends downwardly from the main panel region so as to catch at least an upper part of a thorax of the occupant.

With the occupant protection device of the invention, if an occupant draws away from the backrest of the seat and moves forward in the event of a collision of the vehicle, the extended panel region of the front panel section will firstly catch at least the upper region of the thorax of the occupant and suppress a further forward movement of the occupant, and then the main panel region of the front panel section will catch the occupant's head. That is, the front panel section of the airbag will catch not only the occupant's head but also the thorax and prevent a damage which would otherwise be given to the neck of the occupant, thus protecting the head in an adequate fashion.

Therefore, the occupant protection device of the invention is capable of catching and protecting the occupant's head with the airbag in an adequate fashion when the head moves forward in the event of a collision of the vehicle.

In the occupant protection device of the invention, the airbag includes the left panel section and right panel section in addition to the front panel section. The left and right panel sections will catch the occupant's head if the head moves towards the left or right in the event of a collision. If the head moves rearward upon a collision, the head will be caught and protected with an upper region of the backrest. Therefore, in whichever direction the head moves in the event of a collision of the vehicle, the occupant protection device will protect the head in an adequate fashion.

"Head" in this specification is intended to refer to an entire area above the neck of an occupant including the face, chin and ears, not only the head in a narrow sense.

It is desired in the occupant protection device of the invention that the airbag further includes a ceiling panel section deployable above the head of the occupant.

Such a ceiling panel section will catch the top of the occupant's head in the event of a rollover of the vehicle, and therefore, the occupant protection device will be capable of protecting the occupant's head in more collision patterns of a vehicle.

It is further desired in the occupant protection device of the invention that:
  the airbag includes a primary inflatable region that is inflatable in an initial stage of airbag inflation into an inverse U shape at an upper edge region of each of the left panel section and right panel section;
  the primary inflatable region includes a rear edge inflatable region deployable at a rear edge region of each of the left panel section and right panel section, a front edge inflatable region deployable at a front edge region of each of the left panel section and right panel section and a ceiling edge inflatable region deployable in such a manner as to connect upper ends of the rear edge inflatable region and front edge inflatable region and having gas communication with the rear edge inflatable region and front edge inflatable region; and
  the primary inflatable region is so configured that the inflation gas flows through in the order of the rear edge inflatable region, the ceiling edge inflatable region, and the front edge inflatable region.

With this configuration, the primary inflatable region will inflate with the inflation gas in the order of the rear edge inflatable region, the ceiling edge inflatable region, and the front edge inflatable region at the upper edge of each of the left panel section and right panel section. That is, the airbag will be deployed firstly at the rear of the occupant's head, above the head and then in front of the head. This way the airbag will be able to deploy the extended panel region of the front panel section up to the front surface of the occupant's thorax via the rear, the upper side and then the front of the head, without having the extended panel region to be engaged with the head in the course of deployment, although the front panel section is formed so long as to reach the thorax by the extended panel region. If thus the extended panel region is deployed on the front surface of the occupant's thorax without being engaged with the head in the course of inflation, the left panel section and right panel section will also be deployed on the left and right of the head in an adequate fashion, and as a consequence, the airbag will be able to deploy its panel sections smoothly around the head.

The airbag of the occupant protection device of the invention is desirably configured such that a lower edge region of each of the left panel section and right panel section serves as a support region that is deployable in such a manner as to contact an upper plane of a shoulder of the occupant and be supported by the shoulder.

This configuration will help steady the deployment position of the airbag relative to the occupant's head, and accordingly help deploy the panel sections of the airbag around the head in an adequate fashion since the support regions (i.e., the lower edge regions of the left panel section and right panel section) contact the upper planes of the shoulders of the occupant and are supported by the shoulders at airbag deployment. Moreover, the airbag can be even more adequately configured in accordance with the physical frame of the occupant by adjusting the length in an up and down direction of the left and right panel sections from the support regions.

It is also desired in the occupant protection device of the invention that a front edge of each of the left panel section and right panel section is jointed with the front panel section over an entire length in an up and down direction.

With this configuration, the left panel section, right panel section and front panel section will be deployed in a gapless, continuous fashion on the left side, right side and in front of the occupant's head at airbag deployment, and will suppress in combination subsequent movements of the head after a part of the airbag once catches the head. As a consequence, the airbag will be able to protect the head quickly and with a sufficient reaction force.

Furthermore, it is desired that each of the left panel section and right panel section includes a plurality of vertical inflatable regions inflatable into such a shape as to extend along an up and down direction such that a front edge and a rear edge of each of the left panel section and right panel section come closer to each other at full inflation than before full inflation.

Such vertical inflatable regions will be contracted in dimension in a direction perpendicular to the axial direction when inflated. Accordingly, when the vertical inflatable regions are fully inflated, the front edge and the rear edge of each of the left panel section and right panel section come closer to each other due to contraction of the vertical inflatable regions than before full inflation, which will pull the front panel section rearward. That is, the above configuration will help deploy the front panel section of the airbag in the course of inflation up to the front of the occupant's head without having it to be engaged with the head, and move it closer to the front face of the head after the airbag has completed inflation. As a consequence, the front panel section at airbag deployment will catch and protect the occupant' head which moves forward and draws away from the backrest of the seat in a further quick and adequate fashion.

The occupant protection device of the invention may also be configured as follows (this configuration will be called a second characterizing configuration):

The left panel section and right panel section extend rearward from left and right edges of the front panel section such that the left panel section, front panel section and right panel section form a generally U shape around the head of the occupant as viewed from above at full deployment of the airbag. The airbag includes, in each of the left panel section and right panel section, a frame inflatable region that is inflatable in an inverse-U shape at the upper edge region of each of the left panel section and right panel section. The frame inflatable region of each of the left panel section and right panel section includes a rear edge inflatable region deployable at the rear edge region of the left/right panel section, a front edge inflatable region deployable at the front edge region of the left/right panel section and a ceiling edge inflatable region deployable in such a manner as to connect upper ends of the rear edge inflatable region and front edge inflatable region and having gas communication with the rear edge inflatable region and front edge inflatable region. The airbag further includes a regulating member that prevents the frame inflatable regions of the left panel section and right panel section from moving in a separating direction at airbag deployment.

With the occupant protection device configured as above, when the airbag is inflated with an inflation gas and fully deployed, the left panel section and right panel section will be deployed at a side of each of the left side and right side of the occupant's head in a shape-retained fashion due to the frame inflatable regions. The frame inflatable regions in the left panel section and right panel section are prevented from moving in an outward direction in a left and right direction by the regulating member. With this configuration, if the occupant's head moves in a left direction and the left panel section catches the head, the left panel section will be prevented from moving away from the right panel section, thus keeping a sufficient reaction force to arrest the head. If the head moves in a right direction and the right panel section catches the head, the right panel section will be prevented from moving away from the left panel section, thus keeping a sufficient reaction force to arrest the head. Moreover, the left panel section and right panel section are configured to extend rearward from the left and right edges of the front panel section so as to be deployed along a front and rear direction and in parallel to each other on the left and right of the head in a symmetrical fashion with respect to the front panel section. With this configuration, if the occupant's head moves towards the left or right, it will be caught and protected immediately with areas of the left and right panel sections which are deployed right beside the head and closer to the head than the front and rear edges of the left and right panel sections.

Therefore, the occupant protection device of the invention is capable of catching the head of the occupant seated in the seat with the airbag in a quick and adequate fashion when the head moves towards the left or right in the event of a collision of the vehicle.

In order to exert the above-described advantageous effect, the extended panel region described above is optional.

In the occupant protection device with the second characterizing configuration, it is desired that the regulating member is so configured as to bring vicinities of centers in a front and rear direction of the ceiling edge inflatable regions of the frame inflatable regions of the left panel section and right panel section closer to each other than front ends of the left and right ceiling edge inflatable regions at airbag deployment.

With this configuration, the distance between the vicinities of the centers in a front and rear direction of the ceiling edge inflatable regions at airbag deployment will be smaller than that between the front ends of the left and right ceiling edge inflatable regions, such that center regions in a front and rear direction of the upper edges of the left panel section and right panel section will be located closer to each other than the front edges. Thus the center regions in a front and rear direction of the upper edges of the left panel section and right panel section and the areas of the left and right panel sections disposed right beside the head will be deployed in proximity to the head on the left and right of the head as if covering the head with a helmet. As a consequence, the airbag as deployed will be capable of catching the head further quickly when the head moves towards the left or right.

The regulating member may be composed, by way of example, of a tether that joins the vicinities of the centers in a front and rear direction of the left and right ceiling edge inflatable regions as inflated together. With this configuration, the distance between the joints of the tether to the left and right panel sections can be easily changed by changing the length of the tether. By way of example, if the occupant protection device of the invention is adapted to be mounted on a seat for an occupant of large build, a long tether may be employed to prepare an airbag for use in the device. To the contrary, if the occupant protection device of the embodiment is adapted to be mounted on a seat for an occupant of small build, a short tether may be employed to prepare an airbag for use in the device.

The regulating member may also be configured as follows:

The airbag further includes a ceiling panel section that is disposed in such a manner as to fill a space between the left and right ceiling edge inflatable regions so as to be deployable above the head of the occupant, a rear upper edge inflatable region that provides gas communication between bent regions formed between the rear edge inflatable region and ceiling edge inflatable region of each of the left panel section and right panel section, and a front upper edge inflatable region that provides gas communication between bent regions formed between the front edge inflatable region and ceiling edge inflatable region of each of the left panel section and right panel section. The ceiling panel section is provided with a top inflatable region that is fed with the inflation gas from at least either one of the rear upper edge inflatable region and front upper edge inflatable region, and the top inflatable region includes a plurality of vertical inflatable regions that are disposed side by side in a left and right direction and each inflatable into a rod shape extending along a front and rear direction. The vertical inflatable regions serve as the regulating member by helping reduce a dimension in a left and right direction of the ceiling panel section at full airbag deployment in comparison with that before full inflation.

In this instance, the vertical inflatable regions of the top inflatable region are desirably disposed in a vicinity of the centers in a front and rear direction of the ceiling edge inflatable regions, because such a configuration will be able to deploy the center regions in a front and rear direction of the upper edges of the left panel section and right panel section and the areas of the left and right panel sections disposed right beside the head in proximity to the head on the left and right of the head as if covering the head with a helmet.

It will be appreciated that the front panel section of the airbag of the occupant protection device with the second characterizing configuration may include a main panel region deployable in such a manner as to be opposed to the front face of the occupant's head and an extended panel region that extends downwardly from the main panel region for catching at least an upper part of the thorax of the occupant as the occupant moves forward.

Further, in the occupant protection device with the second characterizing configuration, it is desired that the front panel section includes a plurality of vertical inflatable regions each extending in an up and down direction and disposed side by side in order to bring the left and right edges of the front panel section closer to each other at full airbag inflation than before full inflation.

Since such vertical inflatable regions contract in dimension in a direction perpendicular to the axial direction when inflated, when the front panel section is fully inflated, the left and right edges of the front panel section come closer to each other than before full inflation due to contraction of the vertical inflatable regions and the left panel section and right panel section extending rearward from the left and right edges of the front panel section come close to each other as well, such that the areas of the left and right panel sections deployable right beside the head are further approximated to the head. That is, the above configuration will help deploy the left panel section and right panel section of the airbag in the course of inflation on the left and right of the occupant's head without having them to be engaged with the head, and approximate them to the left plane and right plane of the head after the airbag has completed inflation. As a consequence, the areas of the left panel section and right panel section deployed right beside the head will catch and protect the occupant' head movable towards the left or right in a further quick and adequate fashion at airbag deployment.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
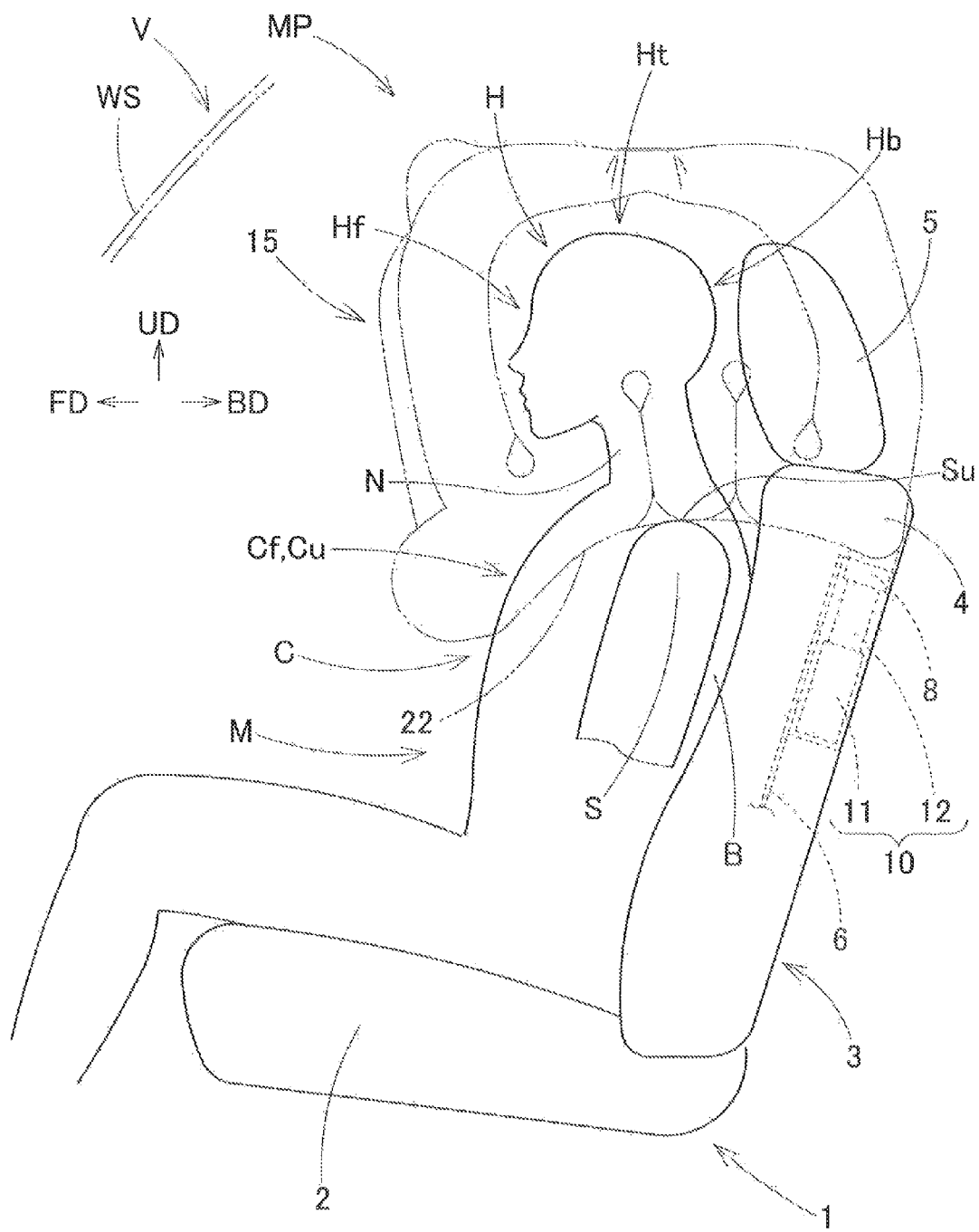
FIG. 1 is a schematic side view of an occupant protection device embodying the invention.
Figure 3:
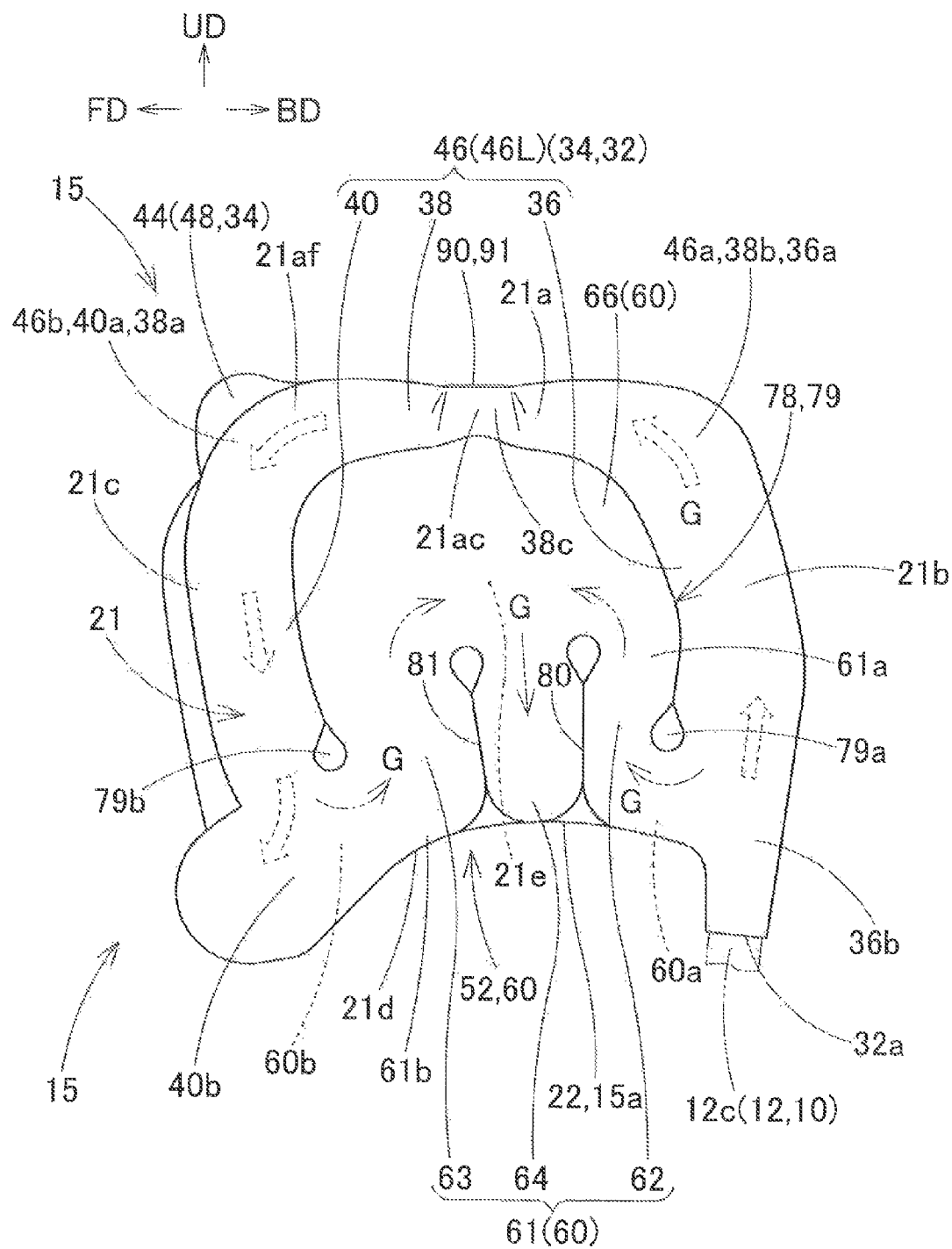
FIG. 3 is a schematic side view of the airbag of FIG. 2 as fully inflated, viewing the left panel section.
Figure 4:
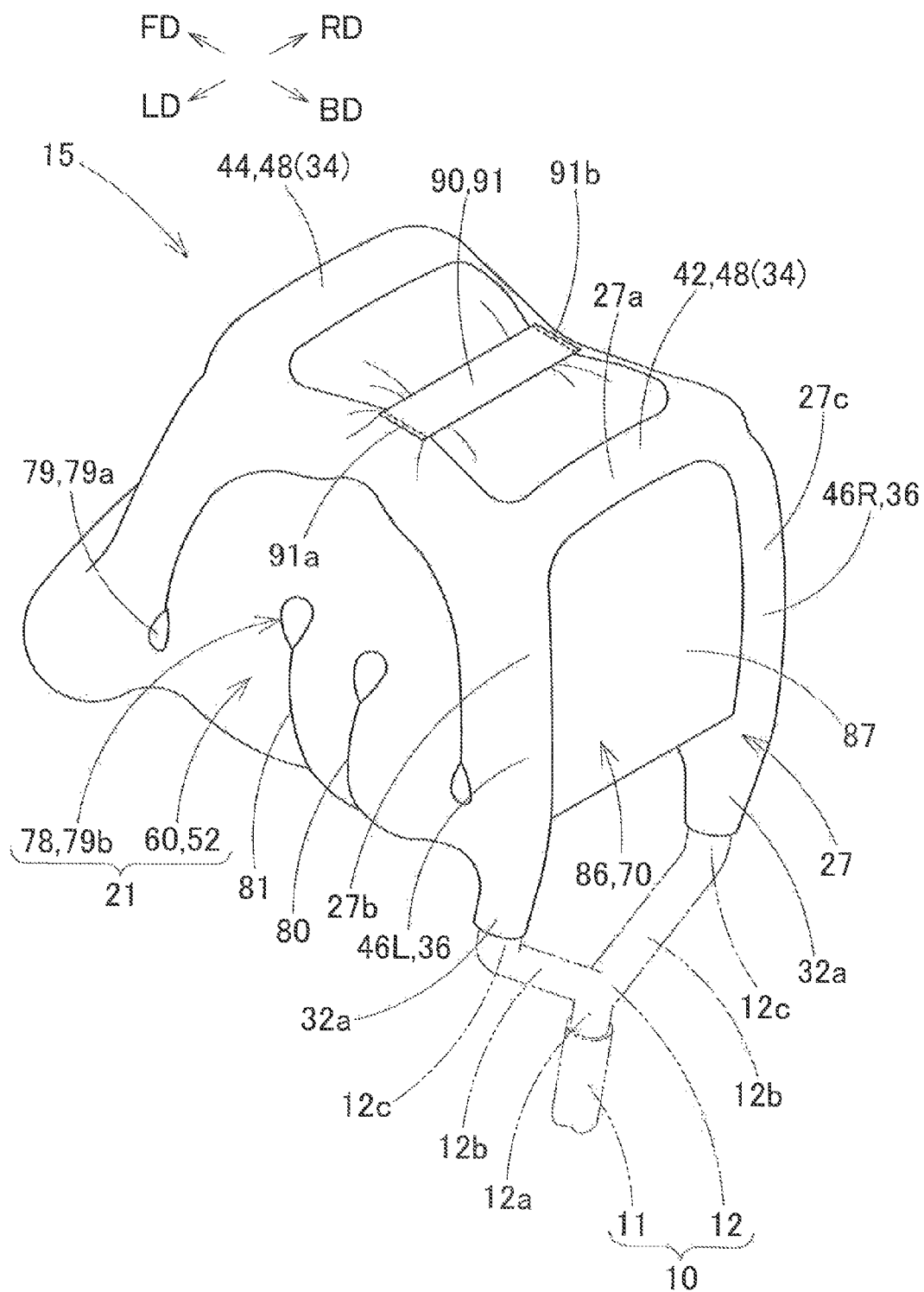
FIG. 4 is a schematic rear perspective view of the airbag of FIG. 2 as fully inflated, viewing the left panel section.

An occupant protection device MP embodying the invention includes an airbag 15 for protecting the head H of an occupant M seated in a seat 1 of a vehicle V and an inflator 10 for feeding the airbag 15 with an inflation gas G, as shown in FIG. 1. As shown in FIGS. 1, 3 and 4, the inflator 10 includes a body 11 and a diffuser 12 for helping feed the inflation gas G discharged from the body 11 to inlet ports 32a of the airbag 15. The diffuser 12 is made of a metal pipe and includes a root region 12a connected with the body 11 and a two-pronged bifurcate region 12b. Each of the leading ends 12c of the bifurcate region 12b is inserted into and connected with each of the two inlet ports 32a of the airbag 15 with the aid of a clamp (not shown). Thus the inflator 10 is connected with the airbag 15. The inflator 10 is secured to a mounting base 6 provided inside a backrest 3 of the seat 1. Unillustrated lead wires extending from a predetermined control are connected with the inflator body 11 for feeding an actuating signal. The control feeds an actuating signal to the inflator body 11 when detecting a collision or a potential collision of the vehicle V.

The mounting base 6 further includes a case or housing 8 for housing the airbag 15 in a folded-up configuration.

The seat 1 includes a seat section 2 and the backrest 3, and the backrest 3 includes a main body 4 to support the back B of the occupant M and a headrest 5 disposed on the backrest 3 for supporting the rear side Hb of the head H of the occupant M. The mounting base 6 is disposed inside the main body 4 of the backrest 3.

The vehicle V on which the seat 1 is mounted has self-driving capability, and therefore, no problem will occur if the airbag 15 covers the head H of the driver (occupant M) and deprives him of his sight when the occupant protection device MP is actuated. Further, since the occupant protection device MP is mounted on the backrest 3 of the seat 1, the airbag 15 will smoothly cover and protect the head H of the driver (occupant M) if the driver is seated in such a manner as to face away from the traveling direction of the vehicle V, i.e., face away from the front windshield WS, when the occupant protection device MP is actuated.

The airbag 15 can be formed by jointing a plurality of flexible sheet members of fabrics or the like of polyamide or the like by sewing, adhesion or the like. The airbag 15 can also be made by one-piece woven technology, molding technologies such as injection molding and blow molding. Referring to FIGS. 2 to 8, 12 and 13, the airbag 15 as inflated includes a front panel section 17 deployable in front of the front face Hf of the head H of an occupant M seated in the seat 1, a left panel section 21 deployable at a side of the left side Hl of the occupant's head H and a right panel section 23 deployable at a side of the right side Hr of the occupant's head H. Each of the front panel section 17, left panel section 21 and right panel section 23 is formed into a generally rectangular plate. The front panel section 17 has a greater width in a left and right direction than that of the head H and covers the front face Hf of the head H. The left panel section 21 extends towards the rear BD from the left edge 17c of the front panel section 17 and covers the left side Hl of the occupant's head H with a greater width in a front and rear direction than that of the head H. The right panel section 23 extends towards the rear BD from the right edge 17d of the front panel section 17 and covers the right side Hr of the occupant's head H with a greater width in a front and rear direction than that of the head H. Thus the front panel section 17, left panel section 21 and right panel section 23 form a generally U shape around the occupant's head H at airbag deployment as viewed from above.

The airbag 15 of the illustrated embodiment further includes a ceiling panel section 25 which has a generally rectangular plate shape and is deployable above the occupant's head H and a rear panel section 27 which has a generally rectangular plate shape and is deployable at the rear of the occupant's head H, specifically, at the rear of the headrest 5.

Front, rear, left and right in this specification are intended to refer to the front, rear, left and right as viewed from the occupant M. That is, "front" refers to a forward direction as viewed from the occupant M, "rear" refers to a rear direction as viewed from the occupant M, and "left" and "right" refer to left and right as viewed from the occupant M.

In the illustrated embodiment, the front edge 21c of the left panel section 21 and the front edge 23c of the right panel section 23 are each jointed with the left and right edges 17c and 17d of the front panel section 17 over an entire length in an up and down direction by the intermediary of later-described front edge inflatable portions 40. The rear edge 21b of the left panel section 21 and the rear edge 23b of the right panel section 23 are each jointed with the left and right edges 27b and 27c of the rear panel section 27 over an entire length in an up and down direction by the intermediary of later-described rear edge inflatable portions 36. The outer peripheral edge of the ceiling panel section 25 is entirely jointed with the upper edge 17a of the front panel section 17, the upper edge 21a of the left panel section 21, the upper edge 23a of the right panel section 23 and the upper edge 27a of the rear panel section 27 by the intermediary of later-described inflatable regions 38, 42 and 44.

In other words, the airbag 15 of the illustrated embodiment is inflatable into such a generally parallelepiped or box that is composed of the interconnected five panel sections 17, 21, 23, 25 and 27 and has a generally rectangular opening 15b (FIGS. 12 and 13) at the lower edge 15a.

Figure 7:
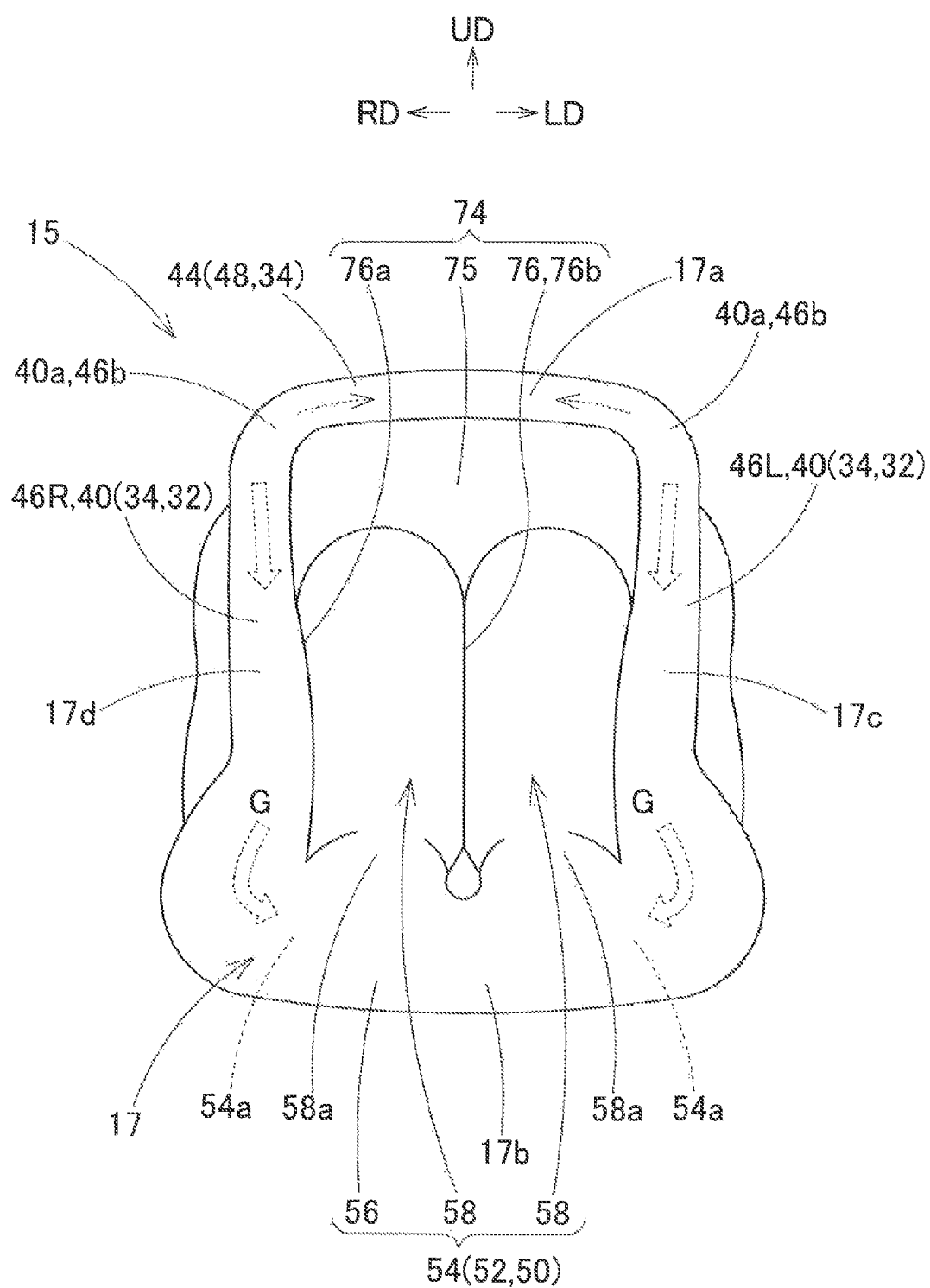
FIG. 7 is a schematic front view of the airbag of FIG. 2 as fully inflated.

The front panel section 17 is designed to cushion the occupant's head H in the event that the head H moves towards the front direction FD, i.e., moves in such a manner as to draw away from the backrest 3 of the seat 1. If the head H has not so moved, the front panel section 17 will be deployed at a distance from the head H in a front direction FD. The left panel section 21 is designed to cushion the occupant's head H in the event that the head H moves towards the left direction LD. If the head H has not so moved, the left panel section 21 will be deployed at a distance from the head H in a left direction LD. The right panel section 23 is designed to cushion the occupant's head H in the event that the head H moves towards the right direction RD. If the head H has not so moved, the right panel section 23 will be deployed at a distance from the head H in a right direction RD. The ceiling panel section 25 is designed to catch a vicinity of the top Ht of the occupant's head H in the event of a rollover of the vehicle V. If the vehicle V has not overturned, the ceiling panel section 25 will be deployed at a distance from the occupant's head H in an upward direction UD (FIGS. 7 and 13).

The front panel section 17 of the airbag 15 as inflated includes a main panel region 18 which is deployable in such a manner as to be opposed to the front face Hf of the occupant's head H and an extended panel region 19 extending downwardly from the main panel region 18. The extended panel region 19 is designed to catch at least an upper part Cu of the thorax C of the occupant M when the occupant M moves towards a front direction FD and away from the backrest 3 of the seat 1 at airbag deployment. The extended panel region 19 of the illustrated embodiment is so sized that the lower end almost reaches the second rib bone from the bottom of a standard male adult (AM50 dummy).

Figure 12:
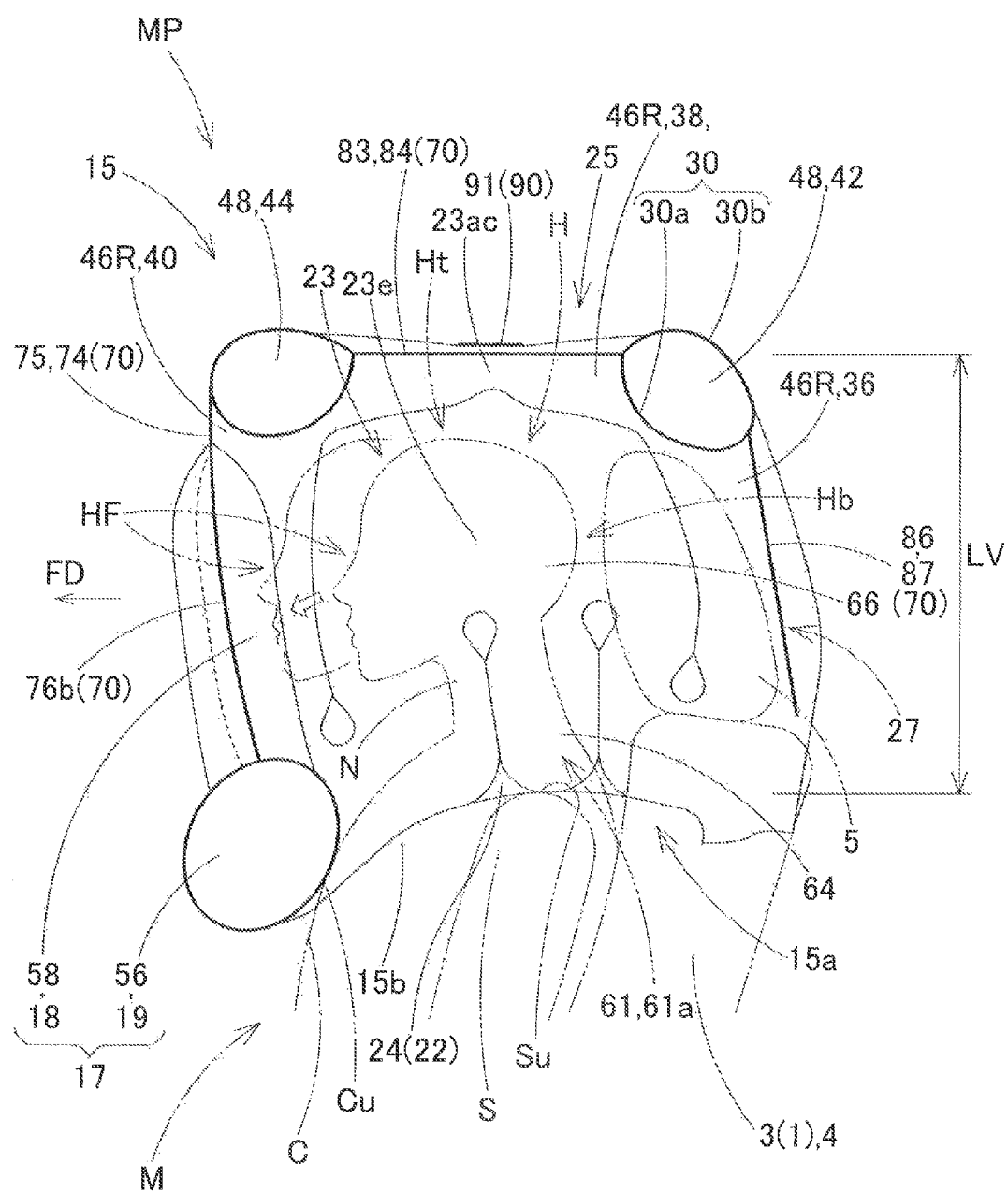
FIG. 12 is a schematic vertical section of the occupant protection device having completed operation, taken along a front and rear direction.
Figure 13:
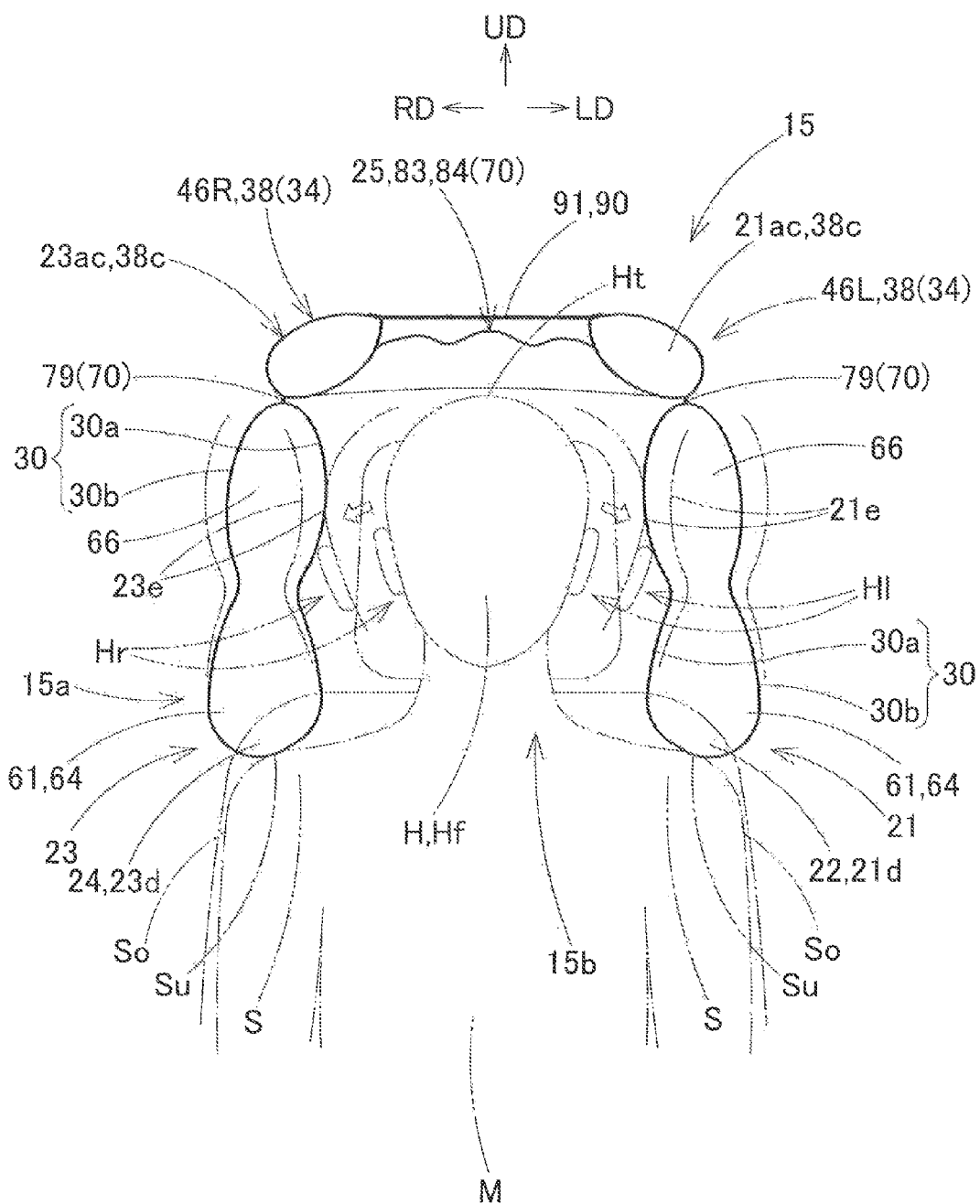
FIG. 13 is a schematic vertical section of the occupant protection device having completed operation, taken along a left and right direction.

The airbag 15 includes a gas admitting region 30 which is inflatable with an inflation gas G in such a manner as to separate an inner wall 30a deployable towards the occupant's head H and an outer wall 30b deployable on an outer side of the airbag 15, and an uninflatable region 70 which does not admit the inflation gas G and where the inner wall 30a and outer wall 30b stay attached together (FIGS. 12 and 13).

Referring to FIGS. 2 to 7, the gas admitting region 30 includes a primary inflatable region 32 which is in gas communication with the inlet port 32a connected with the inflator 10 and a secondary inflatable region 50 which is to be inflated later than the primary inflatable region 32.

The primary inflatable region 32 includes two inflatable regions (main stream inflatable regions) 46 (46L and 46R) each of which is inflatable into an inverse-U shaped rod (or a pipe) at the upper edge 21a/23a of each of the left panel section 21 and right panel section 23. Each of the main stream inflatable regions 46L and 46R includes a rear edge inflatable region 36 deployable in a vicinity of the rear edge 21b/23b of the left/right panel section 21/23, a front edge inflatable region 40 deployable in a vicinity of the front edge 21c/23c of the left/right panel section 21/23 and a ceiling edge inflatable region 38 connecting the upper ends 36a and 40a of the rear edge inflatable region 36 and front edge inflatable region 40.

Figure 6:
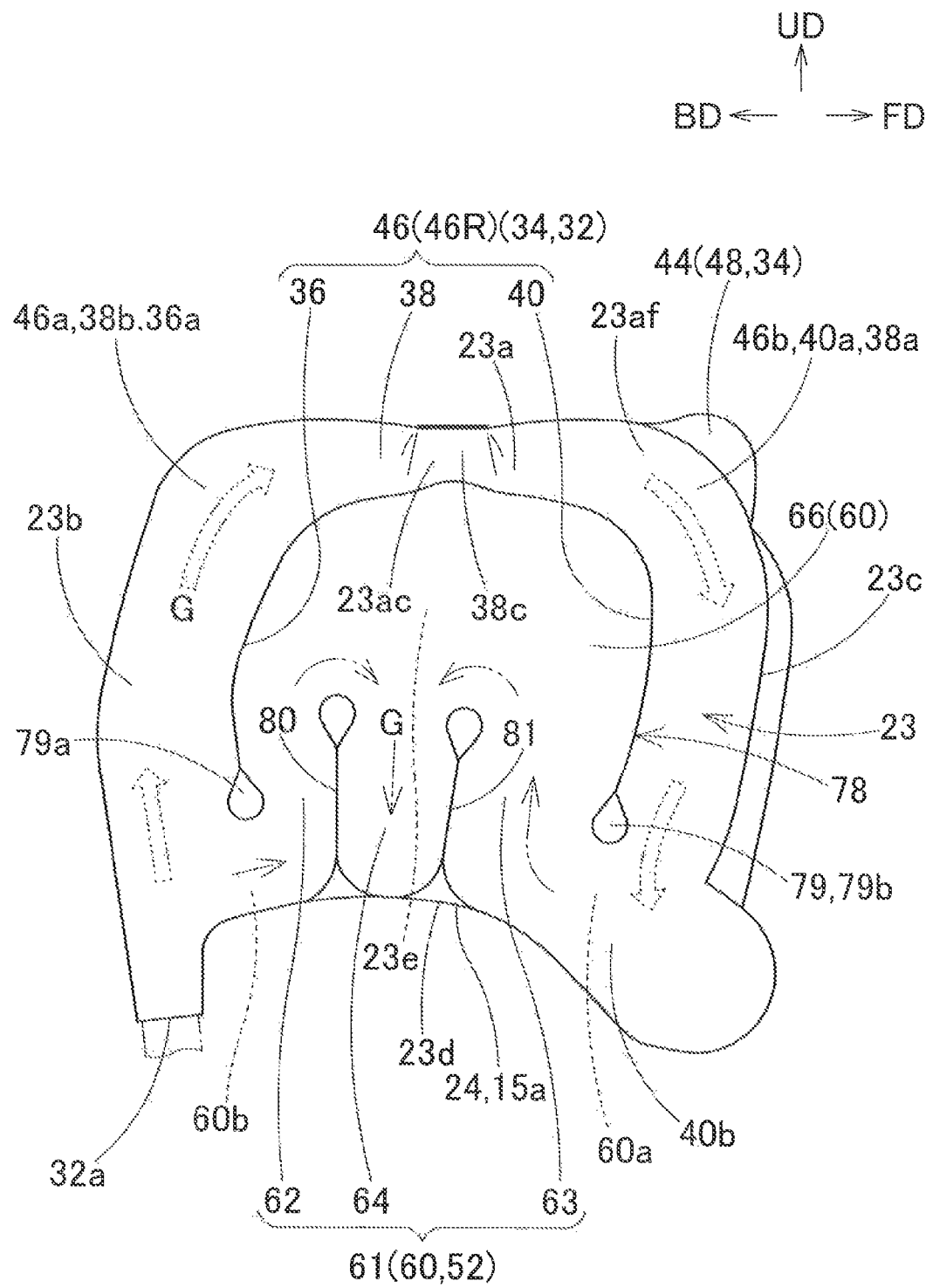
FIG. 6 is a schematic side view of the airbag of FIG. 2 as fully inflated, viewing the right panel section.

The lower ends 36b of the rear edge inflatable regions 36 of the main stream inflatable regions 46L and 46R serially continue to the inlet ports 32a of the airbag 15, such that an inflation gas G flows firstly into the rear edge inflatable regions 36, and then flows through the ceiling edge inflatable regions 38 and front edge inflatable regions 40. Each of the ceiling edge inflatable regions 38 is connected with the upper end 36a of the rear edge inflatable region 36 in a bent fashion at the rear edge 38b, thus forming a bent region 46a between the ceiling inflatable region 38 and rear edge inflatable region 36 as shown in FIGS. 3 and 6. Each of the front edge inflatable regions 40 is connected with the front end 38a of the ceiling edge inflatable regions 38 in a bent fashion at the upper edge 40a, thus forming a bent region 46b between the front edge inflatable region 40 and ceiling edge inflatable region 38, as shown in FIGS. 3 and 6. Although the inflatable regions 36, 38 and 40 form an inverse U shape with the bent regions 46a and 46b at the upper edge 21a of the left panel section 21 and at the upper edge 23a of the right panel section 23, the inflation gas G will smoothly flow through the main stream inflatable regions 46L and 46R since the curvature of the bent regions 46a and 46b is not so big. Moreover, since the inflatable regions 36, 38 and 40 have generally equal inner diameters (or widths in an uninflated, flattened state), the inflatable regions 36, 38 and 40 will inflate smoothly and quickly in an initial stage of inflow of the inflation gas G.

The airbag 15 of the illustrated embodiment further includes an inflatable region 42 and an inflatable region 44 which are arranged along a left and right direction and provides gas communication between the left and right main stream inflatable regions 46L and 46R. Specifically, the inflatable region 42 connects the bent regions 46a of the left and right main stream inflatable regions 46L and 46R. The inflatable region 44 connects the bent regions 46b of the left and right main stream inflatable regions 46L and 46R. The inflatable region 42 is located at an intersection of the ceiling panel section 25 and rear panel section 27, and forms a rear upper edge inflatable region 42 of the airbag 15. The inflatable region 44 is located at an intersection of the ceiling panel section 25 and front panel section 17, and forms a front upper edge inflatable region 44 of the airbag 15. The rear upper edge inflatable region 42 and front upper edge inflatable region 44 each form a branched inflatable region 48 since the inflation gas G will flow into the inflatable regions 42 and 44 in such a manner as to branch off from the main stream inflatable regions 46L and 46R.

In the illustrated embodiment, the inflatable regions 36, 38, 40, 42 and 44 are disposed on five sides of the outer surface of the generally parallelepiped airbag 15 as inflated, i.e., on each side where the front panel section 17, left panel section 21, right panel section 23, ceiling panel section 25 and rear panel section 27 intersect. If each of these inflatable regions is inflated into a rod shape, they will form a frame in combination and exert rigidity, and provide a shape retention property to the airbag 15 as inflated. That is, these inflatable regions 36, 38, 40, 42 and 44 serve as a frame inflatable region 34 which helps keep the airbag 15 in a generally parallelepiped shape at airbag deployment.

An inflation gas G fed from the inlet pots 32a flows through the left and right main stream inflatable regions 46L and 46R having the inflatable regions 36, 38 and 40 quickly, and then flows into the branched inflatable regions 48 (i.e., the rear upper edge inflatable region 42 and front upper edge inflatable region 44) in a branched fashion in a direction perpendicular to the main stream inflatable regions 46L and 46R. Accordingly, the branched inflatable regions 48 are designed to be inflated slightly later than the main stream inflatable regions 46L and 46R. That is, the main stream inflatable regions 46L and 46R constitute the primary inflatable region 32, while the branched inflatable regions 48 constitute the secondary inflatable region 50.

Other than the branched inflatable regions 48, the secondary inflatable region 50 includes a plurality of panel inflatable regions 52 disposed within an area of each of the front panel section 17, left panel section 21 and right panel section 23. Each of the panel inflatable regions 52 admits an inflation gas G from the main stream inflatable regions 46L and 46R and is inflatable into a panel shape.

A front inflatable region 54 serves as the panel inflatable region 52 disposed in the front panel section 17. The front inflatable region 54 includes, at the lower end, a horizontal inflatable region 56 inflatable into a rod extending in a left and right direction. The front inflatable region 54 further includes two vertical inflatable regions 58 which extend upwardly from the horizontal inflatable region 56 and are disposed side by side. Each of the vertical inflatable regions 58 is inflatable into a rod. The horizontal inflatable region 56 is disposed in a generally quarter area at the lower end region of the front panel section 17 and includes one each inlet port 54a at the left and right ends for gas communication with the lower ends 40b (FIGS. 3 and 6) of the left and right front edge inflatable regions 40. Each of the vertical inflatable regions 58 is in gas communication with the horizontal inflatable region 56 at the lower end 58a. The vertical inflatable regions 58 are disposed in a generally two third area of the region above the horizontal inflatable region 56 of the front panel section 17 in such a manner as to occupy a generally entire area in a left and right direction of the front panel section 17.

The front inflatable region 54 is designed to admit an inflation gas G from the left and right front edge inflatable regions 40 via the left and right inlet ports 54a. Specifically, the horizontal inflatable region 56 is firstly inflated and then the vertical inflatable regions 58 admits the inflation gas G from the horizontal inflatable region 56.

The vertical inflatable regions 58 constitute a head arresting section for cushioning mainly the head H of an occupant M when he moves forward, and constitute the aforementioned main panel region 18 (FIG. 2) of the front panel section 17 for cushioning the head H. The horizontal inflatable region 56 constitutes a thorax arresting section for arresting the thorax C of the occupant M when he moves forward, and constitutes the aforementioned extended panel region 19 of the front panel section 17 for cushioning at least the upper part Cu of the thorax C of the occupant M.

The front inflatable region 54 includes a plurality of (two, in the illustrated embodiment) vertical inflatable regions 58 extending in an up and down direction. Such a vertical inflatable region 58 contracts in dimension in a direction perpendicular to the axial direction when inflated. Accordingly, when the front panel section 17 is fully inflated, the left and right edges 17c and 17d of the front panel section 17 come closer to each other than before full inflation due to contraction of the vertical inflatable regions 58 as well as the front edge 21c of the left panel section 21 and front edge 23c of the right panel section 23, such that the left panel section 21 and right panel section 23 extending rearward from the front edges 21c and 23c come close to each other as well.

More specifically, since the vertical inflatable regions 58 are disposed above the horizontal inflatable region 56 and in a vicinity of the center in an up and down direction of the front panel section 17, when the airbag 15 is inflated, the front edges 21c and 23c of the left and right panel sections 21 and 23 come close to each other mainly at the center in an up and down direction.

A side inflatable region 60 disposed in each of the left panel section 21 and right panel section 23 serves as the panel inflatable region 52. Each of the side inflatable region 60 includes, at the lower region, three vertical inflatable regions 61 each inflatable into a rod extending in an up and down direction. The vertical inflatable regions 61 are disposed side by side along a front and rear direction. The side inflatable region 60 further includes, at the upper region, a horizontal inflatable region 66 which is inflatable into a rod extending along a front and rear direction. The vertical inflatable regions 61 are composed of a rear region 62, a front region 63 and a central region 64 disposed between the rear region 62 and front region 63. Each of the vertical inflatable regions 61 is in gas communication with the horizontal inflatable region 66 by the upper end 61a. The rear region 62 includes a rear inlet port 60a at the rear lower end for communication with a vicinity of the lower end 36b of the rear edge inflatable region 36. The front region 63 includes a front inlet port 60b at the front lower end for communication with a vicinity of the lower end 40b of the front edge inflatable region 40.

Each of the side inflatable regions 60 is configured such that the rear region 62 of the vertical inflatable regions 61 admits an inflation gas G from the rear edge inflatable region 36 via the rear inlet port 60a while the front region 63 of the vertical inflatable regions 61 admits an inflation gas G from the front edge inflatable region 40 via the front inlet port 60b, then the horizontal inflatable region 66 admits the inflation gas G from the upper ends 61a of the rear region 62 and front region 63, and the central region 64 of the vertical inflatable regions 61 admits the inflation gas G from the horizontal inflatable region 66.

Each of the side inflatable regions 60 is also configured such that the lower ends 61b of the vertical inflatable regions 61 extend up to the lower edge 21d/23d of the left panel section 21/right panel section 23, and each of the lower edges 21d and 23d of the left panel section 21 and right panel section 23 extends downwardly towards the front in a curved fashion in such a manner as to be shaped to an upper plane Su of the shoulder S of the occupant M. The three vertical inflatable regions 61 are configured such that the lower ends 61b form the lower edge 21d/23d of each of the left panel section 21 and right panel section 23. Since the vertical inflatable regions 61 are not likely to be contracted in an up and down direction, the lower ends 61b of the vertical inflatable regions 61 constitute a support region 22/24 which is deployable in such a manner as to contact the upper plane Su of the shoulder S of the occupant M and be supported by the shoulder S in each of the left panel section 21 and right panel section 23.

The horizontal inflatable region 66 is disposed in a generally upper half area of each of the side inflatable regions 60 at airbag deployment and constitutes a head arresting section for arresting the occupant's head H when he moves towards the left or right.

Each of the side inflatable region 60 includes a plurality of (three, in the illustrated embodiment) vertical inflatable regions 61 extending in an up and down direction. Such a vertical inflatable region 61 contracts in dimension in a direction perpendicular to the axial direction when inflated, as described above. Accordingly, when the left panel section 21 and right panel section 23 are fully inflated, the front and rear edges 21c and 21b of the left panel section 21 as well as the front and rear edges 23c and 23b of the right panel section 23 come closer to each other than before full inflation due to contraction of the vertical inflatable regions 61. Accordingly, when the vertical inflatable regions 61 are fully inflated, the front panel section 17, which is connected with the front edges 21c and 23c of the left and right panel sections 21 and 23 by the left and right edges 17c and 17d, will be pulled towards the rear BD, i.e., towards the rear panel section 27 which is supported by the headrest 5 and does not move.

Since the vertical inflatable regions 61 are disposed in the lower end region in each of the left and right panel sections 21 and 23, when the vertical inflatable regions 61 are inflated, the horizontal inflatable region 56 (or the extended panel region 19) of the front panel section 17 is especially pulled towards the rear panel section 27.

The uninflatable region 70 has its portions 74, 78, 83 and 86 in the five panel sections 17, 21, 23, 25 and 27 for partitioning the inflatable regions or filling a gap between the inflatable regions and reducing the volume of the inflatable area of the airbag.

Figure 2:
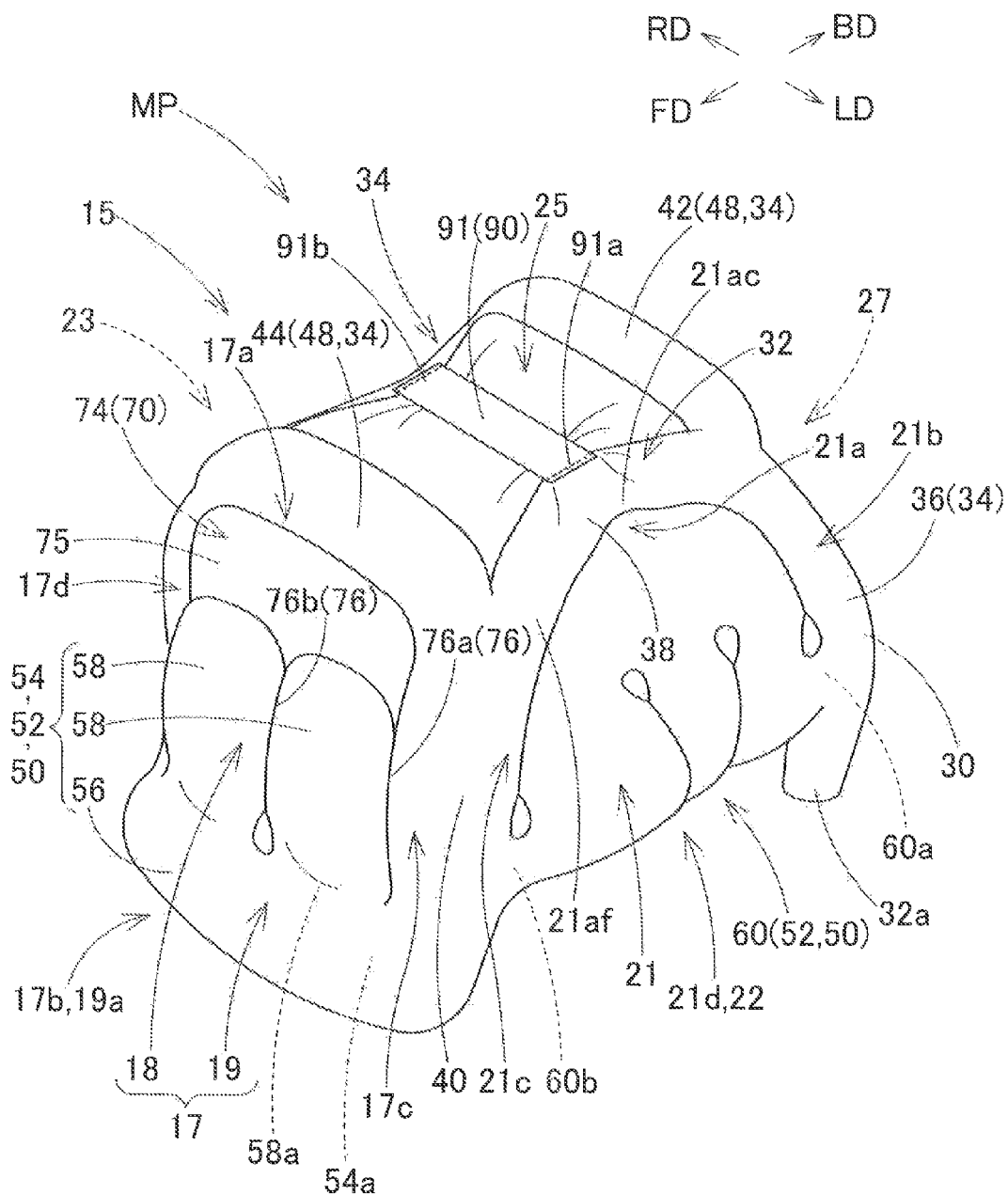
FIG. 2 is a schematic front perspective view of an airbag for use in the occupant protection device of FIG. 1 as fully inflated, viewing a left panel section.

Referring to FIGS. 2 and 7, the front portion 74 of the uninflatable region 70 is disposed in the front panel section 17, and includes a panel region 75 and a linear closed region 76. The panel region 75 is so disposed as to fill a gap between the front upper edge inflatable region 44, left and right front edge inflatable regions 40 and left and right vertical inflatable regions 58. The linear closed region 76 includes side regions 76a which extend downwardly from left and right edges of the panel region 75 to partition the front edge inflatable region 40 from the vertical inflatable region 58 at each of the left and right sides, and a center region 76b which extends downwardly from the center in a left and right direction of the panel region 75 to partition the left and right vertical inflatable regions 58.

Referring to FIGS. 3 and 6, the side portion 78 of the uninflatable region 70 is disposed in each of the left panel section 21 and right panel section 23. The side portion 78 includes three linear closed regions 79, 80 and 81. The linear closed region 79 is disposed in an inverse-U shape along the inner peripheral edge of the main stream inflatable region 46 so as to partition the main stream inflatable region 46 from the side inflatable region 60. The front and rear leading ends or lower ends 79a and 79b of the linear closed region 79 are located close to the lower edge 15a of the airbag 15, thus providing the rear and front inlet ports 60a and 60b of the side inflatable region 60 between the lower edge 15a of the airbag 15 and lower ends 79a and 79b.

The linear closed region 80 extends upwardly from the lower edge 15a of the airbag 15 and partitions the rear region 62 of the vertical inflatable regions 61 from the central region 64. The linear closed region 81 extends upwardly from the lower edge 15a of the airbag 15 and partitions the front region 63 of the vertical inflatable regions 61 from the central region 64.

Figure 8:
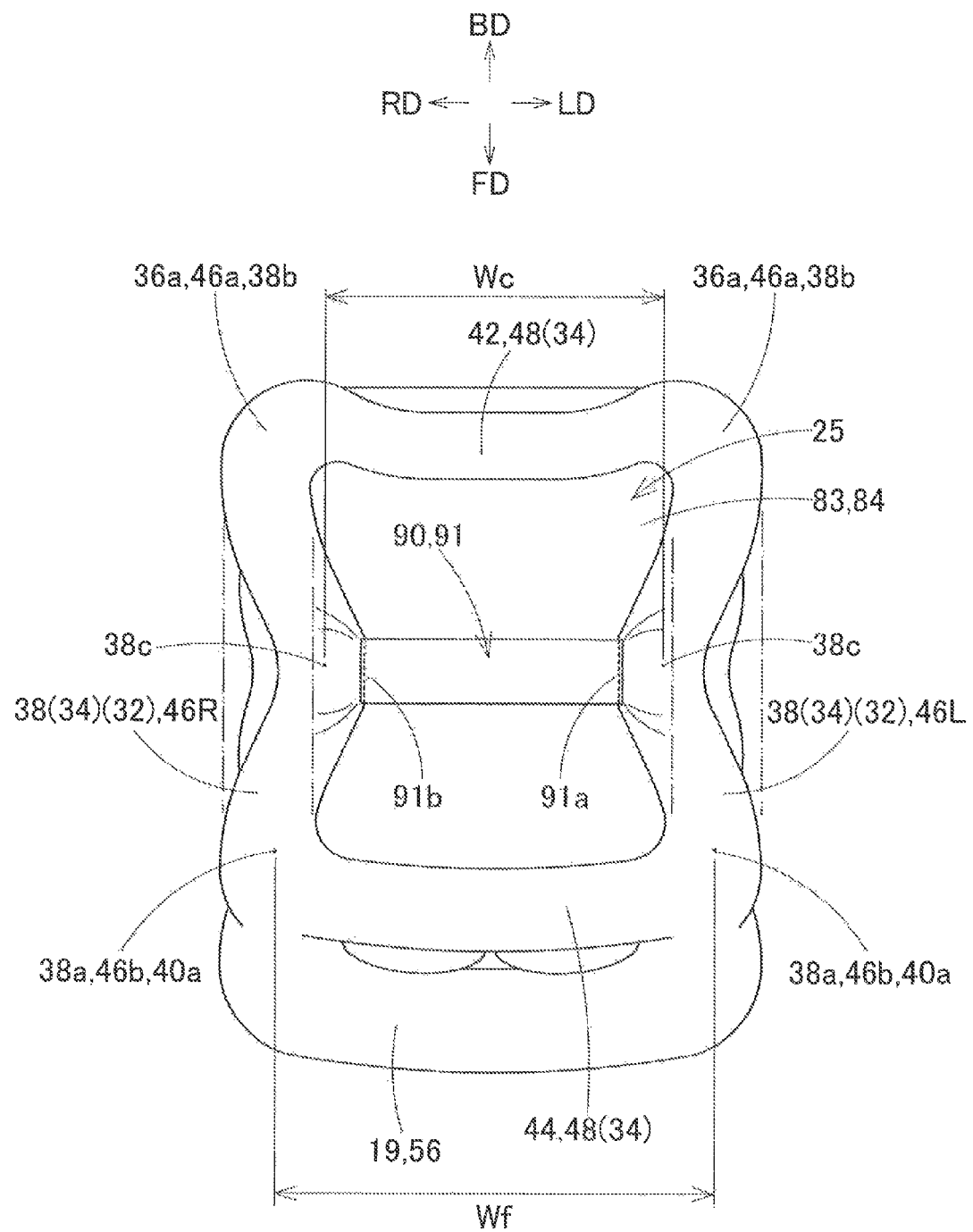
FIG. 8 is a schematic plan view of the airbag of FIG. 2 as fully inflated.

Referring to FIG. 8, the ceiling portion 83 of the uninflatable region 70 disposed in the ceiling panel section 25 is composed of a panel region 84. The panel region 84 is formed into a generally rectangular panel which fills a space between the left and right ceiling edge inflatable regions 38, the rear upper edge inflatable region 42 and front upper edge inflatable region 44. As shown in FIG. 4, the rear portion 86 of the uninflatable region 70 disposed in the rear panel section 27 is composed of a panel region 87. The panel region 87 is formed into a generally rectangular panel which fills a space between the left and right rear edge inflatable regions 36 and rear upper edge inflatable region 42.

Referring to FIGS. 8 and 13, the airbag 15 of the illustrated embodiment further includes a regulating member 90 that prevents the main stream inflatable regions 46L and 46R of the frame inflatable region 34 from moving in a separating direction at airbag deployment. In the illustrated embodiment, the regulating member 90 is so configured as to bring vicinities of the centers 38c of the left and right ceiling edge inflatable regions 38 closer to each other than the front ends 38a of the left and right ceiling edge inflatable regions 38. The regulating member 90 of the illustrated embodiment is composed of a tether 91 which is jointed to the vicinities of the centers 38c of the left and right ceiling edge inflatable regions 38 by the left and right ends 91a and 91b.

To describe the panel sections 17, 21, 23, 25 and 27 of the airbag 15 again adding the configuration of the gas admitting region 30 and uninflatable region 70, the front panel section 17 is composed of the front inflatable region 54 (of the panel inflatable region 52), left and right front edge inflatable regions 40 (of the frame inflatable region 34), an inner region of the front upper edge inflatable region 44 and front portion 74 of the uninflatable region 70. Each of the left and right panel sections 21 and 23 is composed of the side inflatable region 60 (of the panel inflatable region 52), an inner region of the main stream inflatable region 46 and side portion 78 of the uninflatable region 70. The ceiling panel section 25 is composed of the left and right ceiling edge inflatable regions 38 (of the frame inflatable region 34), an inner region of each of the front and rear branched inflatable regions 48 (42 and 44), the panel region 84 of the ceiling portion 83 of the uninflatable region 70 and the tether 91. The rear panel section 27 is composed of the left and right rear edge inflatable regions 36 (of the frame inflatable region 34), an inner region of the rear upper edge inflatable region 42 and the panel region 87 of the rear portion 86 of the uninflatable region 70.

To describe the panel sections 17, 21, 23, 25 and 27 except the frame inflatable region 34 and tether 91, the front panel section 17 is composed of the front inflatable region 54 (of the panel inflatable region 52) and the front portion 74 of the uninflatable region 70, and each of the left and right panel sections 21 and 23 is composed of the side inflatable region 60 (of the panel inflatable region 52) and side portion 78 of the uninflatable region 70. The ceiling panel section 25 is composed of the panel region 84 of the ceiling portion 83 of the uninflatable region 70, and the rear panel section 27 is composed of the panel region 87 of the rear portion 86 of the uninflatable region 70.

Mounting of the occupant protection device MP on a vehicle V is now described. Firstly, the airbag 15 is folded up and the inflator 10 is connected with the inlet ports 32a of the airbag 15. The assembly of the airbag 15 and inflator 10 is stored in the housing 8 in the backrest 3 of the seat 1, and is mounted on the mounting base 6. If the seat 1 is then mounted on the vehicle V and lead wires for feeding an actuating signal are connected to the inflator 10, the occupant protection device MP is mounted on the vehicle V.

If the occupant protection device MP is actuated in response to an actuating signal when a collision or a potential collision is detected, the inflator body 11 feeds an inflation gas G into the airbag 15 via the diffuser 12 and inlet ports 32a of the airbag 15.

Figure 9:
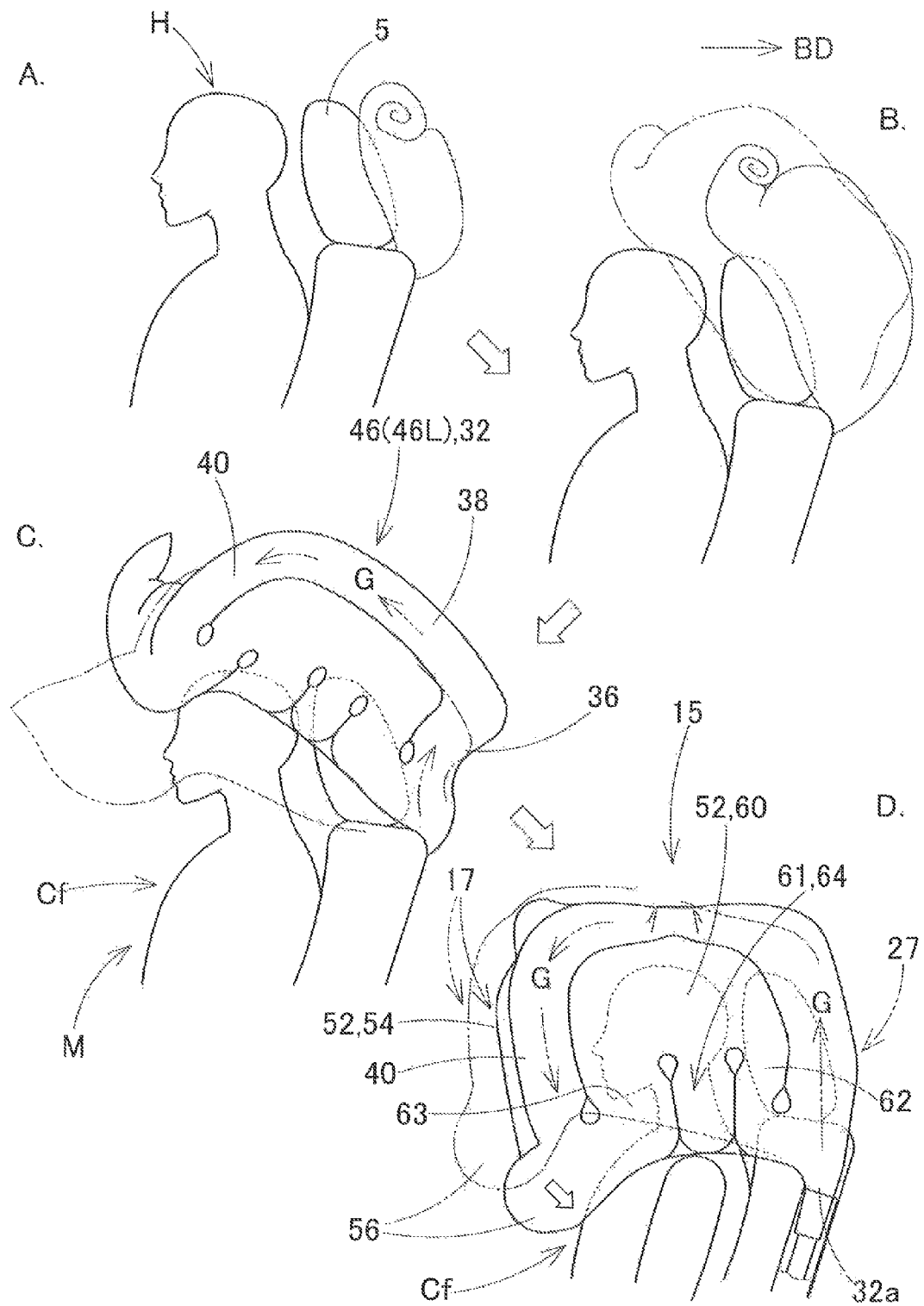
FIG. 9 schematically illustrates the behavior of the occupant protection device of the embodiment as actuated in the order of A, B, C, and D, by side views.
Figure 10:
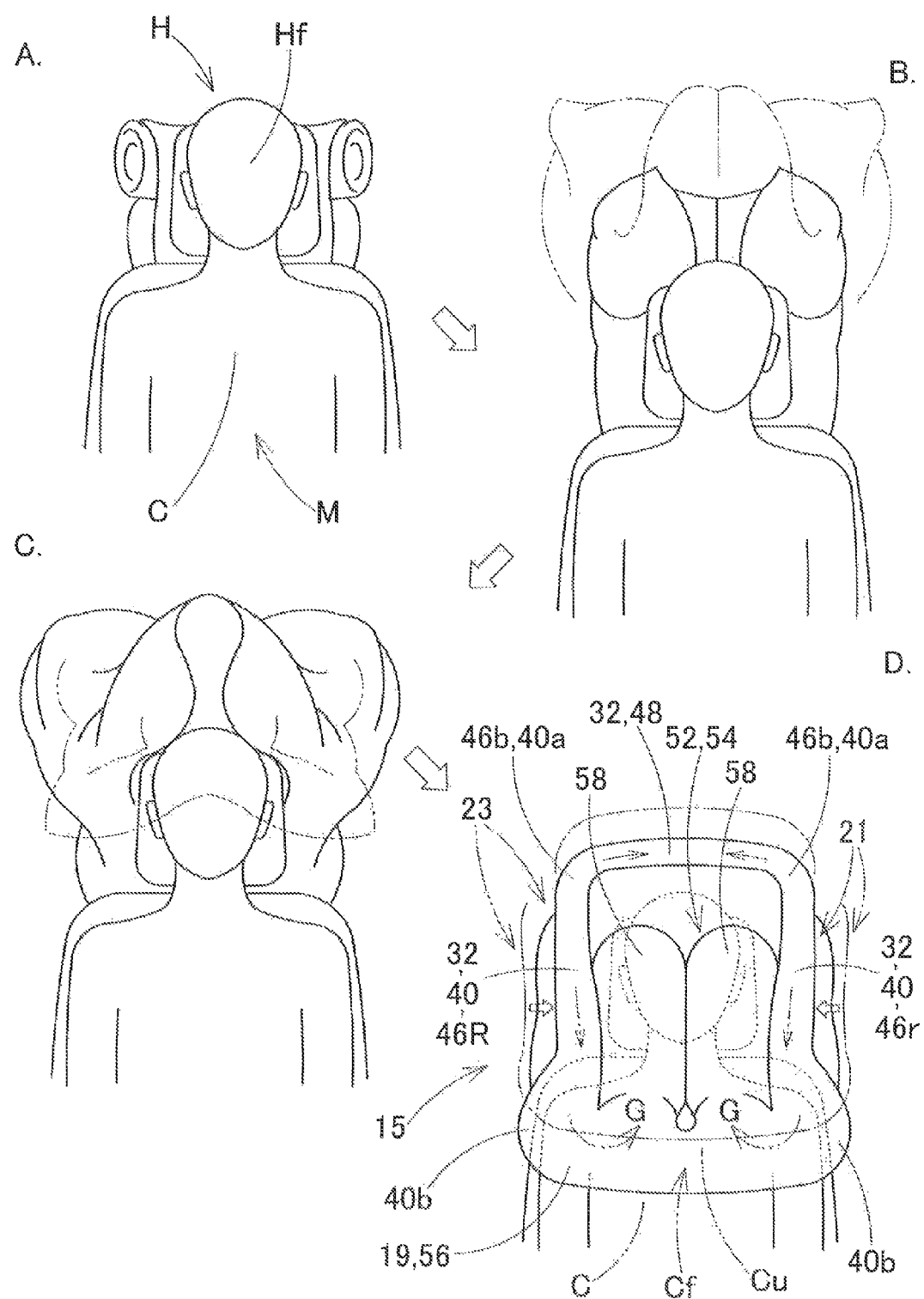
FIG. 10 schematically illustrates the behavior of the occupant protection device of the embodiment as actuated in the order of A, B, C, and D, by front views.

Then the airbag 15 fed with the inflation gas G is inflated starting the primary inflatable region 32, and emerges out of the housing 8. Specifically, in each of the left and right main stream inflatable regions 46L and 46R of the primary inflatable region 32, the rear edge inflatable region 36, ceiling edge inflatable region 38 and front edge inflatable region 40 are inflated in that order and then the rear upper edge inflatable region 42 and front upper edge inflatable region 44 of the branched inflatable region 48 (i.e., of the secondary inflatable region 50) are inflated, and generally simultaneously, the panel inflatable region 52 as the secondary inflatable region 50 is inflated, as shown in FIGS. 9 and 10.

The inflation and deployment of the panel inflatable region 52 is now described. In the front inflatable region 54 in the front panel section 17, since the inflation gas G flowing through the main stream inflatable regions 46L and 46R has a great inertia force, the gas G firstly flows towards the lower ends 40b of the front edge inflatable regions 40 forcefully, then flows into the front inflatable region 54 via the left and right inlet ports 54a and 54b to inflate the horizontal inflatable region 56, and then the left and right vertical inflatable regions 58 are fed with the gas G from the horizontal inflatable region 56 and inflated. In the side inflatable region 60 of each of the left panel section 21 and right panel section 23, fed with the inflation gas G from the front edge inflatable region 40 and rear edge inflatable region 36 via the inlet ports 60b and 60a, the front region 63 and rear region 62 of the vertical inflatable regions 61 are firstly inflated and then the horizontal inflatable region 66 is fed with the inflation gas G from the front region 63 and rear region 62 and inflated, and then the central region 64 of the vertical inflatable regions 61 is inflated with the gas G from the horizontal inflatable region 66. Further, the panel inflatable regions 52 of the left panel section 21 and right panel section 23 keep on inflating until the support regions 22 and 24 (i.e., the lower edges 21d and 23d) of the panel sections 21 and 23 are brought into contact with the upper planes Su of the shoulders S of the occupant M. Thus the airbag 15 completes inflation.

As described above, with the occupant protection device MP, if the occupant M draws away from the backrest 3 of the seat 1 and moves towards a front direction FD in the event of a collision of the vehicle V, the extended panel region 19 of the front panel section 17 will firstly catch at least the upper region Cu of the thorax C of the occupant M and suppress a further forward movement of the occupant M, and then the main panel region 18 of the front panel section 17 will catch the occupant's head H, as shown in FIG. 12. That is, the front panel section 17 of the airbag 15 will catch not only the occupant's head H but also the thorax C, and prevent a damage which would otherwise be given to the neck N of the occupant M, thus protecting the head H in an adequate fashion.

Therefore, the occupant protection device MP of the above-illustrated embodiment is capable of catching and protecting the occupant's head H with the airbag 15 in an adequate fashion when the head H moves forward in the event of a collision of the vehicle.

Further, since the extended panel region 19 of the front panel section 17 is capable of catching the occupant's thorax C, it is also capable of preventing the occupant M from slipping out of the seatbelt.

In the occupant protection device MP of the embodiment, the airbag 15 includes the left panel section 21 and right panel section 23 for covering left and right sides of the occupant's head H. The left and right panel sections 21 and 23 will catch the head H with the head arresting sections (i.e., the horizontal inflatable regions) 66 of the panel inflatable regions 52 (i.e., the side inflatable regions 60) if the head H moves towards the left or right in the event of a collision, as shown in FIG. 13. If the head H moves towards a rear direction BD or towards the backrest 3 of the seat 1 upon a collision, the head H will be caught with the headrest 5. Therefore, in whichever direction the head H moves in the event of a collision of the vehicle, the airbag 15 of the occupant protection device MP will protect the occupant's head H in an adequate fashion.

In the foregoing embodiment, the airbag 15 is configured such that the extended panel region 19 of the front panel section 17 catches the occupant's thorax C before the main panel region 18 catches the head H. More specifically, when the head H moves forward, the airbag 15 will firstly catch the front surface Cf of the thorax C with the extended panel region 19 and decelerate the speed of forward movement of the occupant M, and in that state catch the head H with the main panel region 18. Thus the occupant protection device MP will further help reduce the damage which would otherwise be given to the neck N of the occupant M when catching the head H.

If such an advantageous effect does not have to be considered, the airbag may be so configured that the main panel region 18 catches the occupant's head H at the same time as the extended panel region 19 catches the thorax C. Further alternatively, the airbag may be so configured that the extended panel region 19 catches the thorax C a little after the main panel region 18 catches the head H.

In the occupant protection device MP of the foregoing embodiment, the airbag 15 includes the ceiling panel section 25 deployable above the occupant's head H.

The ceiling panel section 25 will catch the top Ht of the occupant's head H in the event of a rollover of the vehicle V, and therefore, the airbag 15 is capable of protecting the occupant's head H in more collision patterns of a vehicle.

Although the ceiling panel section 25 of the foregoing embodiment is composed of the uninflatable panel region 84, the configuration of the ceiling panel section 25 should not be limited thereby. The uninflatable panel region 84 may be provided only partially. Alternatively, the ceiling panel section 25 may include, in addition to an uninflatable region 70, an inflatable region, like a top inflatable region 68 depicted in FIG. 15 and described later.

If the airbag 15 does not have to address a rollover of the vehicle V, it may be configured without the ceiling panel section 25.

In the occupant protection device MP of the foregoing embodiment, the airbag 15 includes the primary inflatable region 32 which is inflatable in an initial stage of airbag inflation into an inverse U shape at the upper edge region 21a/23a of each of the left panel section 21 and right panel section 23. Each of the primary inflatable regions 32 includes the rear edge inflatable region 36 deployable at the rear edge region 21b/23b of the left panel section 21/right panel sections 23, the front edge inflatable region 40 deployable at the front edge region 21c/23c of the left panel section 21/right panel sections 23 and the ceiling edge inflatable region 38 deployable in such a manner as to connect the upper ends 36a and 40a of the rear edge inflatable region 36 and front edge inflatable region 40, and is so configured that an inflation gas G flows through in the order of the rear edge inflatable region 36, the ceiling edge inflatable region 38, and the front edge inflatable region 40.

With this configuration, the primary inflatable region 32 will inflate with the inflation gas G in the order of the rear edge inflatable region 36, the ceiling edge inflatable region 38, and the front edge inflatable region 40 at the upper edge 21a/23a of each of the left panel section 21 and right panel section 23. That is, the airbag 15 will be deployed firstly at the rear of the occupant's head H, above the head H and then in front of the head H. This way the airbag 15 will be able to deploy the extended panel region 19 up to the front surface Cf of the occupant's thorax C via the rear, the upper side and then the front of the head H without having it to be engaged with the head H in the course of inflation, although the front panel section 17 is formed so long as to reach the thorax C by the extended panel region 19. If thus the extended panel region 19 is deployed on the front surface Cf of the occupant's thorax C without being engaged with the head H on the way, the left panel section 21 and right panel section 23 will also be deployed on the left and right of the head H in an adequate fashion, and as a consequence, the airbag 15 will be able to deploy the panel sections 17, 21, 23, 25 and 27 smoothly around the head H.

Figure 11:
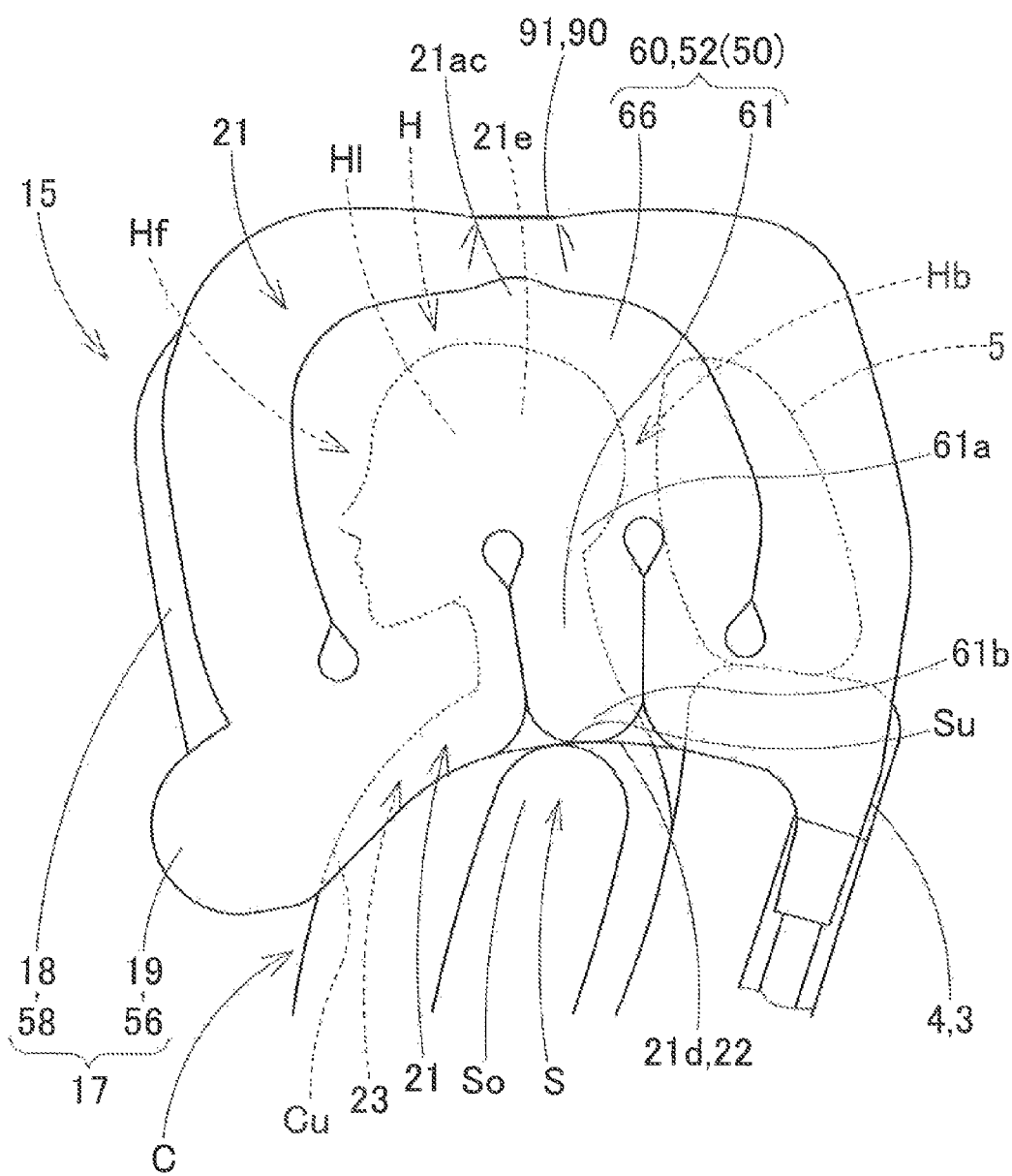
FIG. 11 is a schematic side view of the occupant protection device of the embodiment having completed operation, viewing the left panel section.

In the foregoing embodiment, especially, the airbag 15 is connected with and held by the inflator 10 by the inlet ports 32a disposed at the lower ends 36b of the rear edge inflatable regions 36 at the rear and below the occupant's head H. With this configuration, the airbag 15 will inflate in such a manner as to turn the extended panel region 19 around the held point (i.e., the inlet ports) 32a, in such a manner as to cover in the order of the rear side Hb, the upper side, and the front face Hf of the occupant's head H, as shown in FIGS. 9 to 11. Therefore, although the airbag 15 is formed into a generally parallelepiped having an opening 15b at the bottom 15a, the airbag 15 will be smoothly deployed around the occupant's head H without being engaged with the head H in the course of deployment, as if a box were turned around the head H.

In the foregoing embodiment, moreover, the airbag 15 is so configured that the lower edge regions 21d and 23d of the left panel section 21 and right panel section 23 serve as the support regions 22 and 24 which are deployable in such a manner as to contact the upper planes Su of the shoulders S of the occupant M and be supported by the shoulders S.

This configuration will further help steady the deployment position of the airbag 15 relative to the occupant's head H, and accordingly help deploy the panel sections of the airbag 15 around the head H in an adequate fashion since the support regions 22 and 24 (i.e., the lower edge regions 21d and 23d of the left panel section 21 and right panel section 23) contact the upper planes Su of the shoulders S of the occupant M and are supported by the shoulders S at airbag deployment as shown in FIGS. 11 and 13. Moreover, the airbag 15 can be even more adequately configured in accordance with the physical frame of the occupant M by adjusting the length LV (FIG. 12) in an up and down direction of the left and right panel sections 21 and 23 from the support regions 22 and 24 to the upper edges 21a and 23a. By way of example, if a seat is averagely expected to be sat with an occupant of large build, the airbag mounted on the seat may be configured to have a greater length or height LV to be able to address a large head disposed at a higher level. To the contrary, if a seat is averagely expected to be sat with an occupant of small build, the airbag mounted on the seat may be configured to have a small length or height LV to be able to address a small head disposed at a lower level.

The support regions 22 and 24 of the foregoing embodiment are each composed of the lower end regions 61b of the vertical inflatable regions 61 configured to extend in an up and down direction. Since the vertical inflatable regions 61 are not likely to be contracted in an up and down direction along with inflation, they will keep a predetermined shape retention property and be supported by the shoulders S.

Figure 14:
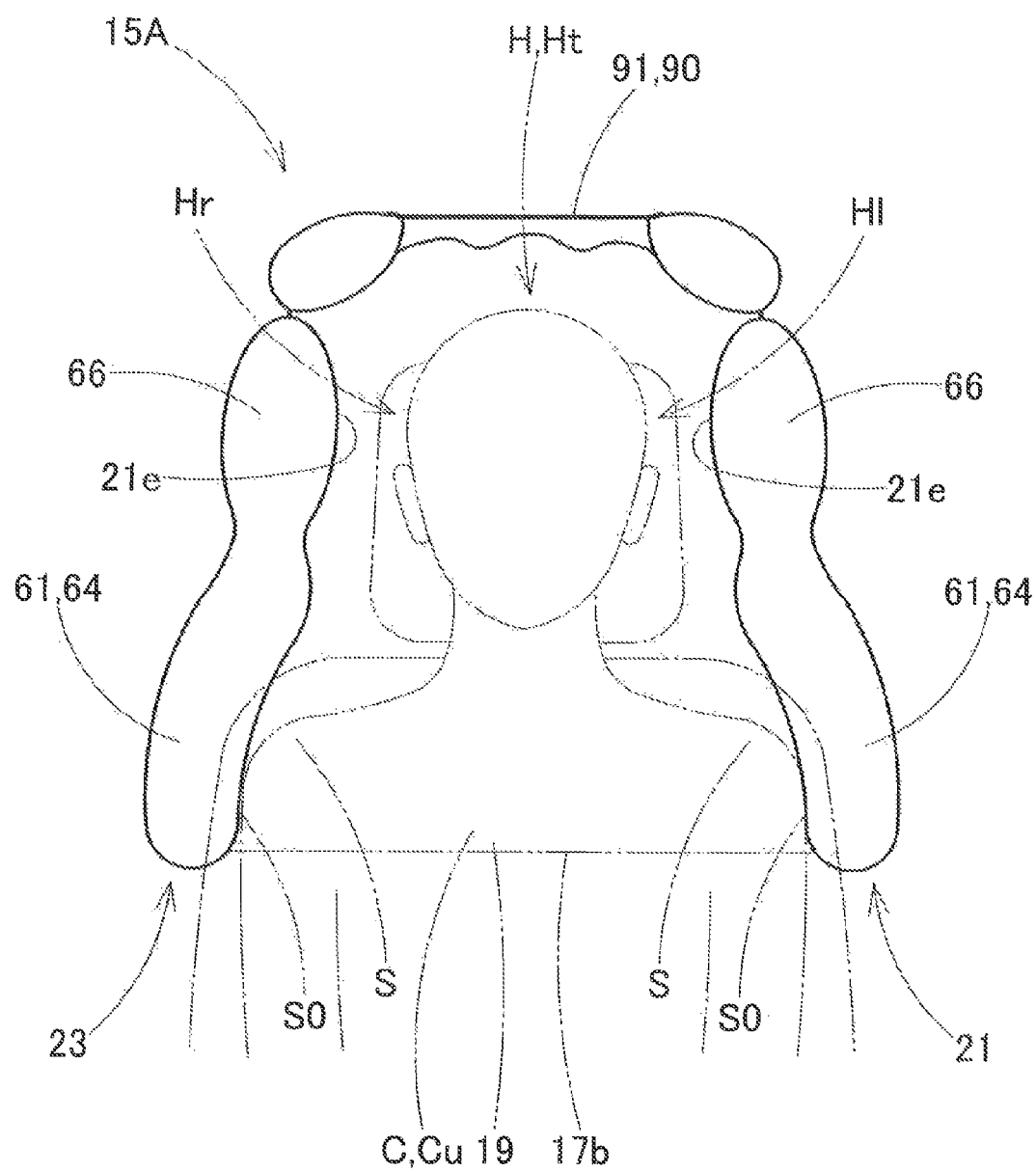
FIG. 14 is a schematic vertical section of an alternative embodiment of an airbag as fully inflated, taken along a left and right direction.

The airbag 15 may be formed without the support regions 22 and 24 at the lower edge regions 21d and 23d of the left panel section 21 and right panel section 23, and may alternatively be configured to catch outer sides So of the shoulders S. Even in this instance, the lower edge region 17b of the front panel section 17 (the horizontal inflatable region 56, by way of example) will serve as the support region to contact with and be supported by the upper part Cu of the occupant's thorax C, and help steady the deployment position of the panel sections of the airbag 15. With such a configuration, moreover, as in an airbag 15A depicted in FIG. 14, the left panel section 21 and right panel section 23 are extended to such an extent as to catch the outer sides So of the shoulders S, thus catching the head H and shoulders S when moving towards the left or right.

It will be desirable, however, that the airbag 15 includes both the support regions 22 and 24 to be supported by the upper planes Su of the shoulders S and the horizontal inflatable region 56 to contact with and be supported by the upper part Cu of the thorax C, such that the airbag 15 will be supported in an even steadier fashion and the deployment position of the panel sections of the airbag 15 will be steadied.

In the foregoing embodiment, the front edges 21c and 23c of the left panel section 21 and right panel section 23 are jointed with the front panel section 17 over an entire length in an up and down direction by the intermediary of the front edge inflatable regions 40.

With this configuration, the left panel section 21, right panel section 23 and front panel section 17 will be deployed in a gapless, continuous fashion on the left side, right side and in the front of the occupant's head H at airbag deployment, and will suppress in combination subsequent movements of the head H after a part of the airbag 15 once catches the head H. As a consequence, the airbag 15 will be able to protect the head H quickly and with a sufficient reaction force.

In the foregoing embodiment, especially, the rear panel section 27 connects the rear edges 21b and 23b of the left panel section 21 and right panel section 23 together by the intermediary of the rear edge inflatable regions 36, such that an entire airbag 15 will be deployed into a continuous, generally square tube, and the panel sections 17, 21 and 23 will further suppress in combination subsequent movements of the head H after a part of the airbag 15 once catches the head H. As a consequence, the airbag 15 will be able to protect the head H quickly and with a sufficient reaction force.

If such an advantageous effect does not have to be considered, the left panel section 21 and right panel section 23 may be partially jointed with the front panel section 17 by the upper end regions only, or may even be separated from the front panel section 17.

In the occupant protection device MP of the foregoing embodiment, each of the left panel section 21 and right panel section 23 includes a plurality of (three, in the illustrated embodiment) vertical inflatable regions 61 extending along an up and down direction such that the front edge 21c/23c and the rear edge 21b/23b of each of the left panel section 21 and right panel section 23 come closer to each other at full inflation than before full inflation.

Such vertical inflatable regions 61 are contracted in dimension in a direction perpendicular to the axial direction when inflated. Accordingly, when the vertical inflatable regions 61 are fully inflated, the front edge 21c/23c and the rear edge 21b/23b of each of the left panel section 21 and right panel section 23 come closer to each other due to contraction of the vertical inflatable regions 61 than before full inflation, and the front panel section 17 will be pulled towards the rear BD, i.e., towards the rear panel section 27 which is prevented from moving by the headrest 5 (the moving behavior of the front panel section 17 is shown with double-dotted lines and solid lines in D. of FIG. 9). That is, the above configuration will help deploy the front panel section 17 of the airbag 15 in the course of inflation up to the front of the occupant's head H without having the front panel section 17 to be engaged with the head H, and move it closer to the front face Hf of the head H after the airbag has completed inflation. As a consequence, the front panel section 17 at airbag deployment will catch and protect the occupant' head H which moves forward and draws away from the backrest 3 of the seat 1 in a further quick and adequate fashion.

The occupant protection device MP of the illustrated embodiment has a following second characterizing advantageous effect.

When the airbag 15 is inflated with an inflation gas G and fully deployed, the left panel section 21 and right panel section 23 will be deployed at a side of each of the left side Hl and right side Hr of the occupant's head H in a shape-retained fashion due to the main stream inflatable regions 46L and 46R of the frame inflatable region 34. The airbag 15 includes the tether 91 (i.e., the regulating member 90) that prevents the main stream inflatable regions 46L and 46R from moving in an outward direction in a left and right direction. With this configuration, if the occupant's head H moves towards a left direction LD and the left panel section 21 catches the head H, the left panel section 21 will be prevented from moving away from the right panel section 23, thus keeping a sufficient reaction force to arrest the head H, as shown in FIG. 13. If the occupant's head H moves towards a right direction RD and the right panel section 23 catches the head H, the right panel section 23 will be prevented from moving away from the left panel section 21, thus keeping a sufficient reaction force to arrest the head H. Moreover, the left panel section 21 and right panel section 23 are configured to extend towards the rear RD from the left and right edges 17c and 17d of the front panel section 17 so as to be deployed along a front and rear direction and in parallel to each other on the left and right of the occupant's head H, and in a symmetrical fashion with respect to the front panel section 17. With this configuration, if the occupant's head H moves towards the left or right, it will be caught and protected immediately with right-beside regions 21e and 23e of the left and right panel sections 21 and 23, which right-beside regions 21e and 23e are closer to the head H than the front and rear edges 21c, 23c, 21b and 23b of the panel sections 21 and 23.

Therefore, the occupant protection device MP of the illustrated embodiment is capable of catching the head H of the occupant M seated in the seat 1 with the airbag 15 in a quick and adequate fashion when the head H moves towards the left or right in the event of a collision of the vehicle V.

The regulating member 90 of the illustrated embodiment is so configured as to bring vicinities of the centers 38c in a front and rear direction of the ceiling edge inflatable regions 38 of the frame inflatable regions 34 closer to each other than the front ends 38a of the left and right ceiling edge inflatable regions 38 at airbag deployment.

Figure 5:
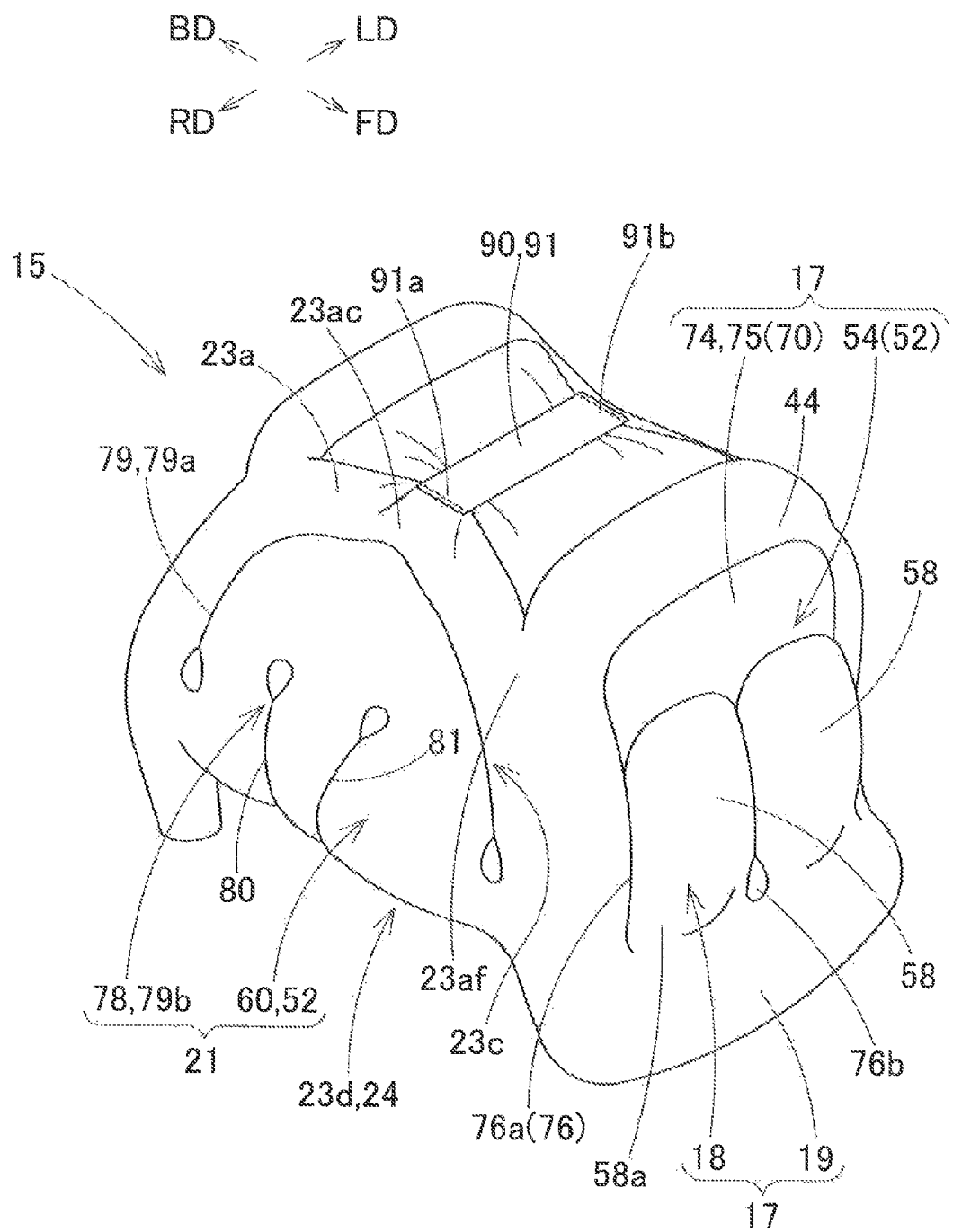
FIG. 5 is a schematic front perspective view of the airbag of FIG. 2 as fully inflated, viewing a right panel section.

As shown in FIG. 8, with this configuration, the distance We between the vicinities of the centers 38c in a front and rear direction of the ceiling edge inflatable regions 38 at airbag deployment will be smaller than the distance Wf between the front ends 38a of the left and right ceiling edge inflatable regions 38, such that center regions 21ac and 23ac in a front and rear direction of the upper edges 21a and 23a of the left panel section 21 and right panel section 23 will be located closer to each other than the front edges 21af and 23af (FIGS. 2 and 5). Thus the center regions 21ac and 23ac in a front and rear direction of the upper edges 21a and 23a of the left panel section 21 and right panel section 23 and the right-beside regions (catching regions) 21e and 23e of the left and right panel sections 21 and 23 disposed right beside the head H will be deployed in proximity to the head H on the left and right of the head H as if covering the head H with a helmet, as shown in FIG. 13. As a consequence, the airbag 15 as deployed will be capable of catching the head H further quickly when the head H moves towards the left LD or right RD. In FIG. 13, double-dotted lines depict a hypothetical catching regions 21e and 23e in an instance where the airbag is not provided with a regulating member 90 whereas solid lines depict the catching regions 21e and 23e of the illustrated embodiment provided with the tether 91 serving as the regulating member 90.

In the illustrated embodiment, furthermore, the tether 91 serving as the regulating member 90 joins together the vicinities of the center regions 38c in a front and direction of the left and right ceiling edge inflatable regions 38 of the frame inflatable regions 34 as inflated. If the regulating member 90 is composed of such a tether 91, the distance between the joints 91a and 91b of the tether 91 to the left and right panel sections 21 and 23 can be easily changed by changing the length of the tether 91. By way of example, if the occupant protection device of the embodiment is adapted to be mounted on a seat for an occupant of large build, a long tether may be employed to prepare an airbag for use in the device. To the contrary, if the occupant protection device of the embodiment is adapted to be mounted on a seat for an occupant of small build, a short tether may be employed to prepare an airbag for use in the device.

Figure 15:
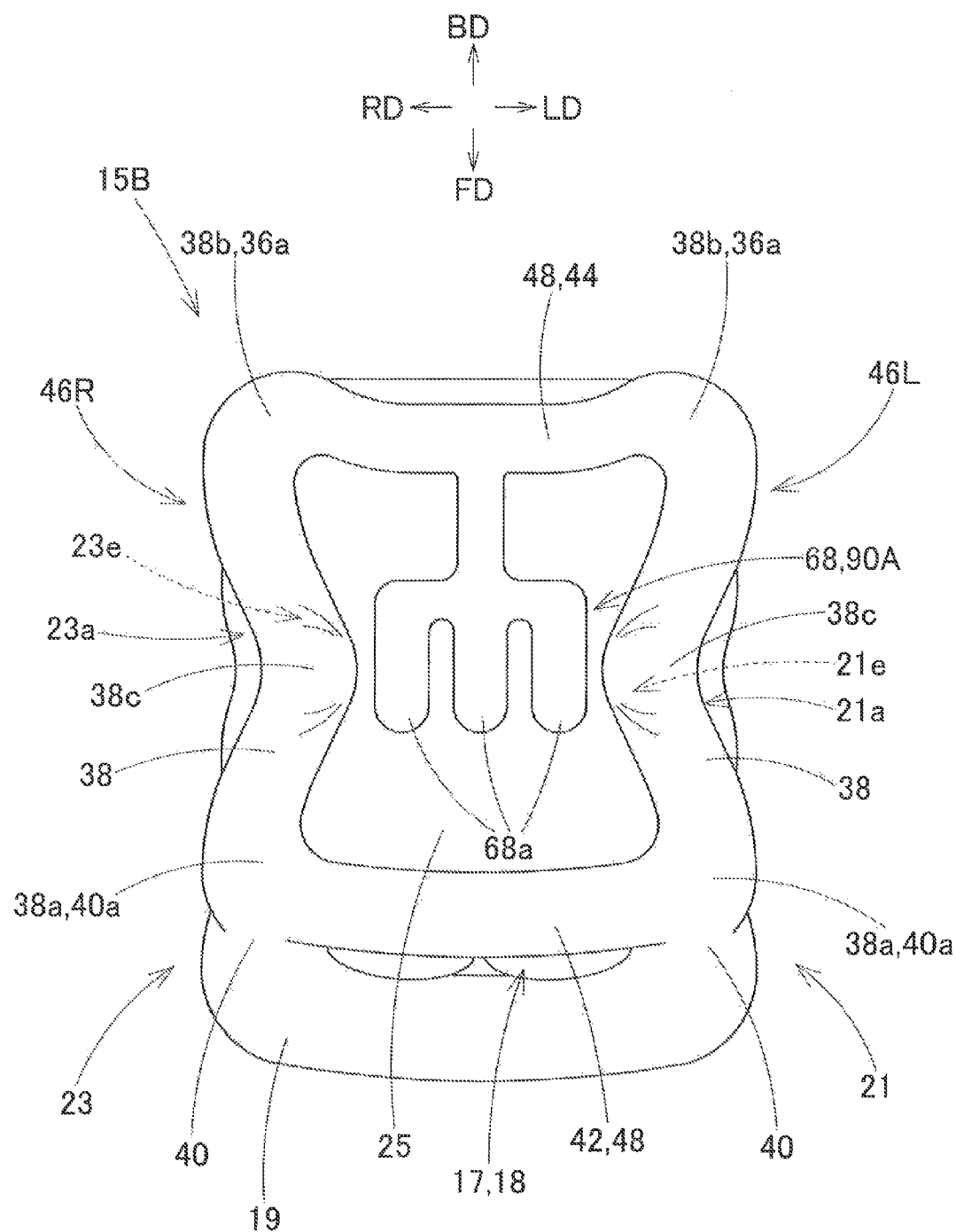
FIG. 15 is a schematic plan view of another alternative embodiment of the airbag as fully inflated.

If such an advantageous effect does not have to be considered, the airbag may be configured without the tether 90, but with a top inflatable region 68 to form the panel inflatable region 52 of the ceiling panel section 25, as in an airbag 15B depicted in FIG. 15. The top inflatable region 68 includes a plurality of vertical inflatable regions 68a that are disposed side by side in a left and right direction and each inflatable into a rod shape extending along a front and rear direction. The top inflatable region 68 of the illustrated embodiment is configured to be fed with an inflation gas G from either the rear upper edge inflatable region 42 or front upper edge inflatable region 44. The vertical inflatable regions 68a serve as a regulating member (region) 90A. This configuration will also help reduce the dimension in a left and right direction of the ceiling panel section 25 when the vertical inflatable regions 68a are inflated, such that the upper edges 21a and 23a of the left and right panel sections 21 and 23 will be brought close to each other as well as the right-beside regions 21e and 23e of the left and right panel sections 21 and 23. Such vertical inflatable regions 68a may be disposed only in the vicinities of the centers 38c of the ceiling edge inflatable regions 38. That way only the vicinities of the centers 38c of the ceiling edge inflatable regions 38 can be brought closer to each other in comparison with the front ends 38a of the ceiling edge inflatable regions 38.

If the present invention is considered with a focus on the second characterizing advantageous effect (that the airbag 15 is capable of catching the occupant's head H in a quick and adequate fashion when the head H moves towards the left or right), the airbag 15 may be formed without an extended panel region 19 in the front panel section 17 for catching the thorax C. In such an instance, the airbag may be configured such that the horizontal inflatable region 56 is shifted upwardly so as to be disposed in an area of the main panel region 18 for catching the head H. Alternatively, the front panel section 17 may be configured without a horizontal inflatable region 56, and configured such that a vicinity of the lower end 40b of each of the front edge inflatable regions 38 directly communicates with the lower end 58a of each of the vertical inflatable regions 58. Even in this way the front panel section 17 will catch and protect the occupant's head H when it moves forward.

When the occupant protection device is not provided with an extended panel region 19, the configuration of the device will be as follows:

The airbag 15, 15A or 15B includes:
 the front panel section 17 deployable in front of the front face Hf of the head H of the occupant M for catching the head H when the head H moves forward;
 the left panel section 21 that extends rearward from the left edge 17c of the front panel section 17 so as to be deployable on a left side of the head H for catching the head H when the head H moves towards the left; and
 the right panel section 23 that extends rearward from the right edge 17d of the front panel section 17 so as to be deployable on a right side of the head H for catching the head H when the head H moves towards the right. Thus the airbag 15, 15A or 15B as fully inflated forms a generally U shape around the head H as viewed from above with the left panel section 21, front panel section 17 and right panel section 23.

The airbag 15, 15A or 15B also includes, in the left panel section 21 and right panel section 23, the frame inflatable region 34 that is inflatable in an inverse-U shape at the upper edge 21a/23a region of each of the left panel section 21 and right panel section 23. Each of the frame inflatable regions 34 includes the rear edge inflatable region 36 deployable at the rear edge 21b/23b region of each of the left panel section 21 and right panel section 23, the front edge inflatable region 40 deployable at the front edge 21c/23c region of each of the left panel section 21 and right panel section 23 and the ceiling edge inflatable region 38 deployable in such a manner as to connect the upper ends 36a and 40a of the rear edge inflatable region 36 and front edge inflatable region 40. The airbag 15, 15A or 15B further includes the regulating member 90 that prevents the frame inflatable regions 34 of the left panel section 21 and right panel section 23 from moving in a separating direction at airbag deployment.

In order to enhance the second characterizing advantageous effect, the front panel section 17 of the airbag 15 of the occupant protection device MP of the illustrated embodiment includes a plurality of (two, in the illustrated embodiment) vertical inflatable regions 58 each extending in an up and down direction and disposed side by side. The vertical inflatable regions 58 will help bring the left and right edges 17c and 17d of the front panel section 17 closer to each other at full airbag inflation than before full inflation.

Such vertical inflatable regions 58 contract in dimension in a direction perpendicular to the axial direction when inflated. Accordingly, when the front panel section 17 is fully inflated, the left and right edges 17c and 17d of the front panel section 17 come closer to each other than before full inflation due to contraction of the vertical inflatable regions 58 and the left panel section 21 and right panel section 23 extending rearward from the left and right edges 17c and 17d of the front panel section 17 come close to each other as well (the deployment behavior of the left panel section 21 and right panel section 23 is shown with double-dotted lines to solid lines in D. of FIG. 10), such that the right-beside regions (catching regions) 21e and 23e deployable immediately beside the head H are further approximated to the head H. That is, the above configuration will help deploy the left panel section 21 and right panel section 23 of the airbag 15 in the course of inflation on the left and right of the occupant's head H without having them to be engaged with the head H, and approximate them to the left side Hl and right side Hr of the head H after the airbag 15 has completed inflation. As a consequence, the right-beside regions (catching regions) 21e and 23e of the left panel section 21 and right panel section 23 at airbag deployment will catch and protect the occupant' head H movable towards the left or right in a further quick and adequate fashion.

If such an advantageous effect does not have to be considered, the front inflatable region 54 (i.e., the panel inflatable region 52) of the front panel section 17 may be provided with only one vertical inflatable region 58. Further alternatively, the front inflatable region 54 of the front panel section 17 may be composed of the horizontal inflatable region(s) 56 only and with no vertical inflatable region 58.

Although the airbag 15 of the illustrated embodiment includes the rear panel section 27, the panel region 87 of the rear portion 86 (i.e., the uninflatable region 70) disposed in the rear panel section 27 may be provided only partially. Further alternatively, the airbag 15 may be formed without a rear portion 86 composed of a panel region 87.

What is claimed is:

1. An occupant protection device mountable on a vehicle for catching a head of an occupant seated in a seat of the vehicle with an inflatable airbag when a collision or a potential collision is detected, the airbag comprising:
   a front panel section inflatable and deployable in front of a backrest of the seat in such a manner as to be opposed to the backrest for catching the head when the head moves forward, the front panel section at full airbag deployment including a main panel region and an extended panel region that extends downwardly from the main panel region for catching a region of the occupant disposed below the head;
   a left panel section inflatable and deployable between a vicinity of a left edge of the backrest and a vicinity of a left edge of the front panel section for catching the head when the head moves towards the left; and
   a right panel section inflatable and deployable between a vicinity of a right edge of the backrest and a vicinity of a right edge of the front panel section for catching the head when the head moves towards the right, wherein:
   the airbag includes a primary inflatable region that is inflatable in an initial stage of airbag inflation into an inverse U shape at an upper edge region of each of the left panel section and right panel section;
   the primary inflatable region includes a rear edge inflatable region deployable at a rear edge region of each of the left panel section and right panel section, a front edge inflatable region deployable at a front edge region of each of the left panel section and right panel section and a ceiling edge inflatable region deployable in such a manner as to connect upper ends of the rear edge inflatable region and front edge inflatable region and having gas communication with the rear edge inflatable region and front edge inflatable region; and
   the primary inflatable region is so configured that an inflation gas flows through in the order of the rear edge inflatable region, the ceiling edge inflatable region, and the front edge inflatable region.

2. The occupant protection device according to claim 1, wherein the airbag is so configured that a lower edge region of each of the left panel section and right panel section serves as a support region that is suppressed from contracting in an up and down direction and adapted to contact an upper plane of a shoulder of the occupant and be supported by the shoulder.

3. The occupant protection device according to claim 1, wherein a front edge of each of the left panel section and right panel section is jointed with the front panel section over an entire length in an up and down direction.

4. The occupant protection device according to claim 1, wherein each of the left panel section and right panel section includes a plurality of vertical inflatable regions inflatable into such a shape as to extend along an up and down direction such that a rear edge and a front edge of each of the left panel section and right panel section come closer to each other at full inflation than before full inflation.

5. The occupant protection device according to claim 1, wherein the occupant protection device is adapted to be mounted on a seat of the vehicle, and wherein the occupant protection device further includes a housing for storing the airbag, and the housing is adapted to be mounted on a region of the seat positioned farther rearward than a seating position of the occupant.

6. An occupant protection device mountable on a vehicle for catching a head of an occupant seated in a seat of the vehicle with an inflatable airbag when a collision or a potential collision is detected, the airbag comprising:
   a front panel section inflatable and deployable in front of a backrest of the seat in such a manner as to be opposed to the backrest for catching the head when the head moves forward, the front panel section at full airbag deployment including a main panel region and an extended panel region that extends downwardly from the main panel region for catching a region of the occupant disposed below the head;

a left panel section inflatable and deployable between a vicinity of a left edge of the backrest and a vicinity of a left edge of the front panel section for catching the head when the head moves towards the left; and a right panel section inflatable and deployable between a vicinity of a right edge of the backrest and a vicinity of a right edge of the front panel section for catching the head when the head moves towards the right, wherein:

the left panel section and right panel section extend rearward from left and right edges of the front panel section such that the left panel section, front panel section and right panel section form a generally U shape as viewed from above at full deployment of the airbag;

the airbag comprises, in each of the left panel section and right panel section, a frame inflatable region that is inflatable in an inverse-U shape at an upper edge region of each of the left panel section and right panel section, the frame inflatable region including a rear edge inflatable region deployable at a rear edge region of each of the left panel section and right panel section, a front edge inflatable region deployable at a front edge region of each of the left panel section and right panel section and a ceiling edge inflatable region deployable in such a manner as to connect upper ends of the rear edge inflatable region and front edge inflatable region and having gas communication with the rear edge inflatable region and front edge inflatable region; and the airbag further comprises a regulating member that prevents the frame inflatable regions of the left panel section and right panel section from moving in a separating direction at airbag deployment.

7. The occupant protection device according to claim 6, wherein the regulating member is so configured as to bring vicinities of centers in a front and rear direction of the ceiling edge inflatable regions of the frame inflatable regions of the left panel section and right panel section closer to each other than front ends of the left and right ceiling edge inflatable regions at airbag deployment.

8. The occupant protection device according to claim 7, wherein the regulating member is composed of a tether that joins the vicinities of the centers in a front and rear direction of the left and right ceiling edge inflatable regions as inflated together.

9. The occupant protection device according to claim 6, wherein the airbag further comprises:

a ceiling panel section that is disposed in such a manner as to fill a space between the left and right ceiling edge inflatable regions so as to be deployable above the head of the occupant;

a rear upper edge inflatable region that provides gas communication between bent regions formed between the rear edge inflatable region and ceiling edge inflatable region of each of the left panel section and right panel section;

a front upper edge inflatable region that provides gas communication between bent regions formed between the front edge inflatable region and ceiling edge inflatable region of each of the left panel section and right panel section; and a top inflatable region that is disposed in the ceiling panel section and is fed with the inflation gas from at least either one of the rear upper edge inflatable region and front upper edge inflatable region, the top inflatable region including a plurality of vertical inflatable regions that are disposed side by side in a left and right direction and each inflatable into a rod shape extending along a front and rear direction, the vertical inflatable regions constituting the regulating member by helping reduce a dimension in a left and right direction of the ceiling panel section at full airbag deployment in comparison with that before full inflation.

10. The occupant protection device according to claim 9, wherein the vertical inflatable regions of the top inflatable region are disposed in a vicinity of the centers in a front and rear direction of the ceiling edge inflatable regions.

11. The occupant protection device according to claim 6, wherein the front panel section of the airbag includes a plurality of vertical inflatable regions each extending in an up and down direction and disposed side by side in order to bring the left and right edges of the front panel section closer to each other at full airbag inflation than before full inflation.

12. The occupant protection device according to claim 6, wherein the occupant protection device is adapted to be mounted on a seat of the vehicle, and wherein the occupant protection device further includes a housing for storing the airbag, and the housing is adapted to be mounted on a region of the seat positioned farther rearward than a seating position of the occupant.

* * * * *